United States Patent [19]

Ushimaru et al.

[11] Patent Number: 5,368,949
[45] Date of Patent: Nov. 29, 1994

[54] MAGNETIC RECORDING MEDIUM HAVING SPECIFIC SUBBING LAYERS AND PROCESS FOR RECOVERY AND PROCESSING THEREOF

[75] Inventors: Akira Ushimaru; Hiroshi Hashimoto; Kazuko Hanai; Keiichi Suzuki, all of Kanagawa, Japan

[73] Assignee: Fuji Photo Film Co., Ltd., Kanagawa, Japan

[21] Appl. No.: 759,293

[22] Filed: Sep. 13, 1991

[30] Foreign Application Priority Data

| Sep. 14, 1990 | [JP] | Japan | 2-245812 |
| Sep. 19, 1990 | [JP] | Japan | 2-249414 |
| Dec. 25, 1990 | [JP] | Japan | 2-412973 |
| Jan. 17, 1991 | [JP] | Japan | 3-004003 |
| Sep. 12, 1991 | [JP] | Japan | 3-233441 |

[51] Int. Cl.$^5$ .............................. G11B 5/66
[52] U.S. Cl. ............... 428/694 BS; 428/694 BB; 428/900
[58] Field of Search ......... 428/694, 900, 336, 694 TS, 428/694 TB, 694 BS, 694 BB

[56] References Cited

U.S. PATENT DOCUMENTS

| 4,411,953 | 10/1983 | Miyoshi et al. | 428/336 |
| 4,487,802 | 12/1984 | Miyoshi et al. | 428/336 |
| 4,504,542 | 3/1985 | Miyoshi et al. | 428/336 |
| 4,671,995 | 6/1987 | Sekiya et al. | 428/336 |
| 4,693,931 | 9/1987 | Andoh et al. | 428/328 |
| 4,708,906 | 11/1987 | Sekiya et al. | 428/336 |
| 4,741,953 | 5/1988 | Katsuta et al. | 428/323 |
| 4,759,954 | 7/1988 | Kubota et al. | 427/128 |
| 5,008,147 | 4/1991 | Ryoke et al. | 428/323 |
| 5,055,352 | 10/1991 | Yamada et al. | 428/336 |
| 5,141,808 | 8/1992 | Hashimoto et al. | 428/336 |

FOREIGN PATENT DOCUMENTS 1234515 4/1986 Germany.
2130124 5/1984 United Kingdom.

OTHER PUBLICATIONS

Database WPIL, No. 81-633 81 D, Derwent Publications Ltd.
Data Base WPIL, No. 85-167 959, Derwent Publications Ltd.

Primary Examiner—Paul J. Thibodeau
Assistant Examiner—H. Thi Le
Attorney, Agent, or Firm—Sughrue, Mion, Zinn, Macpeak & Seas

[57] ABSTRACT

A magnetic recording medium comprising a subbing layer provided between a nonmagnetic plastic support and at least one of a magnetic layer and a backing layer, the magnetic layer and the backing layer each having a void of 40% by volume or less, and the subbing layer having higher solubility in a 0.5 wt % alkaline aqueous solution at 40° C. than that in water at 40° C. and being soluble in a weak alkaline aqueous solution having an initial pH of less than 13 or a low concentration alkaline aqueous solution having 0.25N or less. The subbing layer comprising a polymer containing acidic polar groups, and the subbing layer being soluble in a weak alkaline aqueous solution having an initial pH of less than 13 or a low concentration alkaline aqueous solution having 0.25N or less. A process for recovery and processing of a magnetic recording medium, the process comprising the steps of: (1) cutting a magnetic recording medium comprising a nonmagnetic plastic support having thereon a magnetic layer and/or a backing layer each having a void of 40% by volume or less; (2) dipping pieces of the magnetic recording medium in a weak alkali having an initial pH of less than 13 or a low concentration alkaline aqueous solution having 0.25N or less with stirring so that a subbing layer in the pieces having higher solubility in an alkaline aqueous solution than that in water is dissolved therein to peel off the magnetic layer and/or the backing layer from the nonmagnetic plastic support, and (3) separating the magnetic layer and/or the backing layer from the nonmagnetic plastic support.

23 Claims, No Drawings

MAGNETIC RECORDING MEDIUM HAVING SPECIFIC SUBBING LAYERS AND PROCESS FOR RECOVERY AND PROCESSING THEREOF

FIELD OF THE INVENTION

The present invention relates to a magnetic recording medium comprising a subbing layer provided between a nonmagnetic plastic support and a magnetic layer and/or a backing layer. More particularly, the present invention relates to a magnetic recording medium comprising a subbing layer which has a strong adhesion between a nonmagnetic plastic support and a magnetic layer and/or a backing layer and an excellent durability and exhibits a high peel rate in a weak alkali or low concentration alkaline solution for disposal so that the nonmagnetic plastic support and the magnetic layer and/or backing layer can be easily peeled off and separated from each other and then be easily recovered.

BACKGROUND OF THE INVENTION

In recent years, the demand for a tape-shaped magnetic recording medium comprising a magnetic recording layer (hereinafter referred to as "magnetic layer") for use e.g., in audio equipments, video equipments and computers and a disk-shaped magnetic recording medium comprising a magnetic layer such as a floppy disk has drastically grown regardless of whether they are for general purpose or business purpose. With this drastic increase in the demand for magnetic recording media, there has been a great increase in the amount of defectives and waste articles from the production process and used articles.

This type of a magnetic recording medium generally comprises a magnetic layer having a ferromagnetic powder dispersed in a binder on a film support such as polyester. Therefore, the recovery and reuse of such a film support such as polyester is very important in view of environmental protection.

Such demand for environmental protection is not limited to magnetic tapes. Recovery has been also studied for other materials. For example, in the field of photographic light-sensitive materials, silver and film base are recovered. JP-A-52-138131 (the term "JP-A" as used herein means an "unexamined published Japanese patent application") proposes a film base recovery process which comprises allowing ultrasonic wave to act on recovered waste film articles in a peeling bath for peeling off a light-sensitive layer and/or subbing layer from a support with an alkaline solution so that the peeling can be carried out with a low concentration alkaline solution in a short period of time. Specifically a 26 KHz ultrasonic wave in used to carry out the peeling by dipping in a 2% NaOH aqueous solution at a temperature of 70° C. in 3 minutes.

JP-A-62-160451 proposes a process which comprises dipping a photographic film in an enzyme solution having an activating effect in an alkaline range so that gelatin is decomposed to separate silver from a film base.

JP-A-52-97738 proposes a process for removal of gelatin emulsion film from silver salt photographic films using base films composed of polyester and cellulose derivative by treating with an aqueous solution of an enzyme and the removal of a subbing layer from the mixture with an alkaline aqueous solution.

However, the emulsion layer in these photographic films has little or no void as compared to general magnetic layers and thus greatly differ from magnetic layers having a void of 40% or less at maximum. This produces a great disadvantage in peeling. In other words, the alkaline aqueous solution first dissolves the emulsion layer and then dissolves the subbing layer. This means that the alkaline aqueous solution cannot permeate through the emulsion layer to dissolve the subbing layer. Therefore, it takes much time for the alkaline solution to dissolve and peel off the emulsion layer and the subbing layer.

Such an approach with an alkaline solution to peel off a magnetic layer has been applied to commonly available magnetic tapes. For example, JP-A-53-70404 proposes a magnetic tape recovery and processing which comprises dipping a magnetic tape in a caustic alkaline solution having a concentration of 0.5% or more at an elevated temperature of 70° C. to separate a magnetic material from a plastic film. There is disclosed that peeling cannot be effected with a weak alkali such as sodium carbonate or a low concentration alkaline solution. In its examples, peeling is effected under conditions of a 5 wt % NaOH solution at a temperature of 95° C. in 3 minutes. This shows that the magnetic tape used in the examples exhibits a low peel rate as 3 minutes with a high concentration alkaline solution at an elevated temperature.

JP-A-53-112979 proposes a base film recovery process which comprises peeling with an aqueous solution containing 0.1 to 40% by weight of a basic substance at a temperature of 5° to 150° C. In its examples, peeling was effected under conditions of a 5 wt % NaOH solution at a temperature of 88° C. in 100 minutes or with a 4 wt % NaOH solution at a temperature of 100° C. in 10 minutes. This shows that the magnetic tape used in the examples exhibits an extremely low peel rate.

Further, JP-A-54-66985 proposes a magnetic tape recovery process which comprises dipping a magnetic tape in a strong alkaline solution at a temperature of 25° C. to peel a magnetic layer. An aqueous solution of NaOH having a concentration of 5% by weight or more is used as the alkaline solution. In its examples, among five kinds of magnetic tapes tested, one treated under conditions of 90 minutes at a temperature of 60° C. with a 5 wt % NaOH solution has the highest peel rate.

JP-A-60-223835 proposes a process which comprises addition of a basic substance as well as a surface active agent during peeling. In its examples, the peeling is effected under conditions of a 5 wt % NaOH solution at a temperature of 80° C. in 10 minutes. Similarly, the peel rate thus attained is low.

As processes for the recovery of a base film, there are proposed in JP-A-59-52433 and JP-A-59-91028 starting material recovery processes which comprise cutting a magnetic tape, dipping the pieces in an alkali to swell them, stirring the material at a high speed so that the magnetic layer is separated from the base film, washing the materials, drying the materials, and then magnetically separating the materials. In their examples, an aqueous solution of NaOH having a concentration of 5 to 20% by weight is used. There is disclosed that the magnetic tape used exhibits a peel rate of 20 minutes with a 5 wt % NaOH solution at a temperature of 90° C.

It can thus be seen that the prior art methods for peeling magnetic layer from waste magnetic tapes, an aqueous solution of alkali provide an extremely low peel rate, and magnetic tapes themselves are not provided with special design for peeling.

While the detailed description of the above cited prior arts state that the material can be treated with an aqueous solution having a wide range of concentrations, it can be seen that magnetic tapes disclosed therein do not exhibit such a high peel rate.

An attempt has been made to use special solvent to effect peeling. For example, JP-A-53-92879 and JP-A-53-94381 propose a base film recovery process which comprises processing a magnetic tape with a glycol solution containing 0.01 to 5% by weight of a basic substance (e.g., caustic soda, sodium carbonate, pyridine) at a temperature of 50° to 200° C. However, in their examples, the processing is effected with ethylene glycol at an elevated temperature of 100° C. for 60 minutes or 145° C. for 20 minutes. Under these processing conditions, a polyethylene terephthalate (PET) base film is damaged and the processing cost rises. In other words, ethylene glycol is a starting material for PET and has an extremely high solubility to PET.

JP-A-62-167601 proposes a base film recovery process which comprises dipping the material in a mixture of an organic amine and dimethyl formamide (DMF) to decompose the binder. However, the mixture of an organic amine and DMF cannot be practically used in view of the cost and installment. DMF is a solvent having an extremely high ability to produce a homogeneous system and can dissolve and penetrate PET itself, making it impossible to obtain recovered PET with good qualities.

As a process for the recovery of a base film from a thin metal film type magnetic recording medium, there is proposed in JP-B-1-32295 (the term "JP-B" as used herein means an "examined Japanese patent publication") a process which comprises processing the material with an alkaline solution. That is, a magnetic recording medium recovery and processing is proposed which comprise separation of a magnetic material and a base film which constitute a thin ferromagnetic metal film. The peel rate thus attained is 30 minutes with a 0.5N (2 wt %) NaOH aqueous solution at a temperature of 90° C. Thus, thin metal film type magnetic recording media free of water-soluble subbing layer exhibit an extremely low peel rate.

As mentioned above, various efforts have been made to recover a base film from commercially available magnetic recording media. However, since ordinary magnetic media comprise a subbing layer for only purpose of firmly adhering the nonmagnetic plastic support to the magnetic layer, the magnetic layer cannot be actually peeled from the support unless an extremely strong alkaline aqueous solution or special organic solvent is used. When such a strong alkaline aqueous solution is used, the base film itself is hydrolyzed and the base film thus recovered does not exhibit sufficient qualities for reuse.

In the mechanism of peeling of the prior art methods, the magnetic layer, which comprises a binder cured with a polyisocyanate and insusceptible to hydrolyzation, is little dissolved in an alkaline aqueous solution. The alkaline aqueous solution penetrates the material through voids in the magnetic layer to hydrolyze a polymer such as polyester which constitutes the subbing layer to initiate peeling. At the same time, the polyester base (such as PET) itself begins to be hydrolyzed. Thus, the prior art processing with alkali is disadvantageous in that peeling proceeds with hydrolyzation rather than dissolution, providing a low peel rate. Further, the polyester base film thus recovered shows deterioration in qualities due to hydrolyzation.

On the other hand, various binders have been developed merely to improve the adhesion strength but regardless of peeling properties. For example, in JP-A-62-185227, JP-A-62-195064, JP-A-63-108530, JP-A-63-146213 and JP-A-63-108079, a coating composition for subbing layer using a polyester, in which 5 to 20 mol % of the dicarboxylic acid component is an ester-forming dicarboxylic acid having a sulfonic acid alkaline metal-salt group as a substituent, in combination with carbon black. The carbon black is used to improve electric conductivity, and a water soluble polymer, particularly a sulfonic acid metal salt substituted polyester resin, is used to improve the dispersibility of the carbon black and the adhesion strength. However, because the metal salt of sulfonic acid is completely substituted by alkaline metal salts, the solubility of the polymer in water and that in an alkaline aqueous solution are not changed. Therefore, if peelability is increased, the solubility in water of the polymer is also increased, resulting in that the tape thus-obtained is readily deteriorated by humidity.

JP-A-56-87233, JP-A-61-22423 and JP-A-58-217546 utilize a copolymerized polyester resin containing metal salts of sulfonic acid in a subbing layer. However, both the humidity resistance and the peelability cannot be improved at the same time because sulfonic acid is completely in the form of metal salt groups.

A subbing layer using water soluble polymers is disclosed, for example, in JP-A-61-13435 and JP-A-62-66422. However, because resins having high water solubility are used, both the humidity resistance and the peelability cannot be improved at the same time.

A resin containing carboxyl groups has been used in a subbing layer as described, for example, in JP-B-47-15623, JP-B-60-31011, JP-A-55-55435 and JP-A-2-278511. However, because an isocyanate compound is used in combination, the resin contained in the subbing layer becomes macromolecules that is highly cross-linked. The carboxyl group itself reacts with the isocyanate compound. Therefore, the subbing layer has no solubility in an alkaline aqueous solution.

JP-A-63-182381 discloses a subbing layer coating composition that is an aqueous composition containing a resin having at least one kind of a polar group and at least one unsaturated double bond per one molecule. However, this composition is finally cured by irradiation, and therefore a water-insoluble cross-linked three-dimensional macromolecule is formed, resulting in a subbing layer that is not soluble in an alkaline aqueous solution.

As mentioned above, there have been proposed various compounds as binders for subbing layer. However, since these subbing layers are all designed for only purpose of improving the adhesion between the nonmagnetic plastic support and the magnetic layer and hence improving durability, they are not quite intended for peeling of the magnetic layer the nonmagnetic plastic support by processing with an alkali. When attempted to peel the components, it is quite impossible, or even if possible, peeling cannot be effected unless processing is effected with a strong alkali such as high concentration aqueous solution of NaOH for an extended period of time. As a result of such a prolonged processing with a strong alkali, hydrolyzed PET with deteriorated qualities can only be recovered. Further, polymers having high water-solubility are poor in humidity resistance.

Other examples of subbing layers containing water-soluble groups include easily-adherable subbing layer as described below. For example, JP-A-62-204939 proposes an easily-adherable polyester film comprising a primer layer with an initial Young's modulus of 40 to 20,000 kg/cm² made of an aqueous polyurethane resin and an aqueous acrylic resin. Further, JP-A-62-204940 proposes an easily-adherable polyester film comprising a primer layer made of an aqueous polyurethane resin and an aqueous acrylic resin. Moreover, JP-A-61-175925 proposes a magnetic recording medium comprising a compound containing either or both of sulfonic acid groups and sulfonate groups. These easily-adherable subbing layers are all obtained by stretching the above mentioned easily-adherable layer. Therefore, the easily-adherable layer lies partially on the nonmagnetic plastic support. Thus, even if such an easily-adherable layer is composed of water-soluble group or resin, peeling cannot be easily effected even with an alkaline aqueous solution because the easily-adherable layer lies partially on the support.

As mentioned above, the prior art subbing layer in magnetic recording media has been intended for improvement in the adhesion between the magnetic layer and/or back layer and the nonmagnetic plastic support but with no consideration of peelability of these layers. In other words, no attempts have been made to improve magnetic recording media themselves, particularly subbing layer, for the positive purpose of environmental protection and base film recovery.

SUMMARY OF THE INVENTION

As mentioned above, magnetic recording media which have been already known and put into market are subjected to peeling by force. This present peeling process is effected under extremely strict conditions. The inventors made extensive studies on a subbing layer which can be processed with a weak alkali or low concentration alkaline solution to peel the magnetic layer and/or back layer from the nonmagnetic plastic support without deterioration in the nonmagnetic plastic support, e.g., hydrolyzation of polyethyelene terephthalate (PET) in a short period of time. As a result, it was found that by using a novel polymer in the subbing layer, a magnetic recording medium extremely excellent in environmental protection can be provided which enables easy peeling of magnetic layer to recover nonmagnetic plastic support. Thus, the present invention was accomplished.

It is therefore an object of the present invention to provide a magnetic recording medium suited to environmental protection and a process for the recovery thereof.

It is another object of the present invention to provide a magnetic recording medium comprising a novel subbing layer which exhibits an excellent adhesion between the magnetic layer and/or back layer and the nonmagnetic plastic support but provides an extremely high peel rate by processing with a weak alkali or low concentration alkaline aqueous solution to enable easy peeling of the magnetic layer and/or back layer from the nonmagnetic plastic support so that these layers can be easily separated and recovered.

It is still another object of the present invention to provide a process for the recovery of the above magnetic recording media.

These and other objects and effects of the present invention will become more apparent from the following detailed description and examples.

The present invention provides a magnetic recording medium comprising a subbing layer provided between a nonmagnetic plastic support and at least one of a magnetic layer and a backing layer, the magnetic layer and the backing layer each having a void of 40% by volume or less, and the subbing layer having higher solubility in a 5.0 wt % NaOH aqueous solution at 40° C. than that in water at 40° C. and being soluble in a weak alkaline aqueous solution having an initial pH of less than 13 or a low concentration alkaline aqueous solution having 0.25N or less.

The present invention also provides a magnetic recording medium comprising a subbing layer provided between a nonmagnetic plastic support and at least one of a magnetic layer and a backing layer, the magnetic layer and the backing layer each having a void of 40% by volume or less, the subbing layer comprising a polymer containing acidic polar groups, and the subbing layer being soluble in a weak alkaline aqueous solution having an initial pH of less than 13 or a low concentration alkaline aqueous solution having 0.25N or less.

The present invention also provides a process for recovery and processing of the magnetic recording medium.

DETAILED DESCRIPTION OF THE INVENTION

The subbing layer is soluble in a weak alkaline aqueous solution having an initial pH of 13 or less or a low concentration alkaline aqueous solution having 0.25N or less. The term "soluble" used herein means that the subbing layer is easily soluble in a weak alkaline aqueous solution having an initial pH of 13 or less or a low concentration alkaline aqueous solution having 0.25N or less, so that the magnetic layer and/or backing layer can be peeled off from the nonmagnetic plastic support, and thereby the nonmagnetic plastic support can be recovered without decrease in molecular weight due to hydrolysis nor coloring due to remained magnetic layer. In other words, the property of the subbing layer that it is soluble in the above solutions is a practical property that is actually exhibited during the peeling treatment to peel off the magnetic layer and/or backing layer from the support.

For example, in the batch-wise process in which the time for the peeling treatment is relatively long (about 90 minutes or less), the subbing layer may be dissolved at relatively low temperatures (about 70° C. or less) to peel off the magnetic layer and/or backing layer from the support. In the continuous process, although the treating temperature is relatively high (about from 60° to 100° C.), the subbing layer is dissolved in a extremely short period of time (about 3 minutes or less) to peel off the magnetic layer and/or backing layer from the support. In any case, the nonmagnetic plastic support can be recovered without any deterioration in its properties.

The magnetic recording medium of the present invention is excellent in humidity resistance and peeling can be easily conducted. This is because since the magnetic layer has a void of 40% by volume or less, a weak alkaline aqueous solution or a low concentration alkaline aqueous solution can easily penetrate through the magnetic layer to reach the subbing layer that is contrary to the case of photographic materials, and the subbing layer is composed of a polymer having higher solubility in an alkaline aqueous solution than that in water. Preferably, since the subbing layer is soluble in an organic solvent, the subbing layer can be formed by coating on a nonmagnetic plastic support using an organic solvent without special treatment to the nonmagnetic plastic support. Further, since the subbing layer according to the present invention is soluble in a weak alkaline aqueous solution or a low concentration alkaline aqueous solution, the magnetic layer can extremely easily be peeled off from the support. Therefore, the present invention can provide a magnetic recording medium and a process for recovery and processing thereof that are suited to environmental protection.

The novel polymer for the subbing layer according to the present invention has higher solubility in a 0.5 wt % alkaline aqueous solution at 40° C. than that in water at 40° C. Examples of a polymer having lower solubility in water but having higher solubility in an alkaline aqueous solution include polymers containing acidic polar groups such as —COOH, —SO$_3$H, —SO$_4$H, —PO$_3$H$_2$ and —OPO$_3$H$_2$. These groups have relatively low material solubility, but if they are in contact with an alkaline aqueous solution, they change into, for example, —COONa, —SO$_3$Na, —SO$_4$Na, —PO$_3$Na$_2$ and —OPO$_3$Na$_2$, respectively, so as to have extremely high solubility.

That is, the characteristics of the magnetic recording medium of the present invention reside in that upon using, the subbing layer exhibits good adhesion between the magnetic layer and the support and is low in solubility in water, preferably insoluble in water, resulting in good humidity resistance, and on the other hand, when the magnetic recording medium is disposed and subjected to peeling, the peeling can easily conducted by the use of the polymer soluble in a weak alkaline aqueous solution or a low concentration alkaline aqueous solution. Therefore, the magnetic recording medium that is suited to environmental protection is provided.

The polymer for subbing layer according to the present invention may contain salts such as alkaline metal salts in the polar group. If the salts are contained, the polymer must exhibit acidity as a whole of the polymer, or the polymer must have higher solubility in a 0.5 wt % alkaline aqueous solution at 40° C. than that in water at 40° C. Preferably, the polymer contains no acid polar group that forms a salt.

In the present invention, the weak alkali and the low concentration alkaline aqueous solution are a weak alkali having an initial pH of less than 13 and a low concentration alkaline aqueous solution having a concentration of 0.25N or less, respectively. The weak alkali or low concentration alkaline aqueous solution means an alkaline aqueous solution such that PET is not hydrolyzed. For example, as aqueous solution there can be used any aqueous solution such as weak alkaline aqueous solution containing sodium carbonate, sodium bicarbonate, ammonium carbonate, sodium phosphate, pyridine, triethanol amine, etc., and alkaline aqueous solution containing caustic soda, caustic potash, etc. having such a low concentration that it does not hydrolyze PET. Aqueous solutions of hydroxides, oxides, carbonates, tertiary amine, etc. of alkaline earth metal salt (e.g., Ca) can also be used.

This weak alkaline or low concentration alkaline aqueous solution is preferably an aqueous solution of NaOH having an initial concentration of 1% by weight (0.25N) or less, and more preferably 0.5% by weight or less. With this weak alkaline or low concentration alkaline aqueous solution, the above mentioned subbing layer can be dissolved at a temperature of 40° C.

The subbing layer preferably comprises a polymer that is dissolved in 50 g of a 0.5 wt % aqueous solution of NaOH at a temperature of 40° C. in an amount of at least 1 g as calculated in terms of solid content preferably in 5 minutes. The reason why the solubility in a weak alkali or low concentration alkaline aqueous solution is defined is that a nonmagnetic plastic support such as PET and polyethylene naphthalate (PEN) is not hydrolyzed to mar the quality of the recovered articles.

As polymers to be incorporated in the subbing layer of the present invention there can be used those described below. There can be used polymers that are dissolved in 50 g of a 0.5 wt % aqueous solution of NaOH at a temperature of 40° C. in an amount of 1 g as calculated in terms of solid content preferably in 5 minutes and exhibit higher solubility in an alkaline aqueous solution than polymers that have been heretofore known.

Embodiments of a magnetic recording medium comprising such a polymer include a magnetic recording medium in which the subbing layer comprises a polymer containing a carboxyl group in an amount of $2 \times 10^{-4}$ eq/g or more, a magnetic recording medium in which the subbing layer comprises a polymer having an acid value of 13 or more, a magnetic recording medium in which the subbing layer comprises a copolymer containing as component a monomer containing dicarboxylic acid or its anhydride, a magnetic recording medium in which the subbing layer comprises a polyurethane containing carboxyl group in an amount of $8 \times 10^{-4}$ eq/g or more, and a magnetic recording medium in which the subbing layer comprises a polyurethane having an acid value of 45 or more.

Other embodiments of such a magnetic recording medium include a magnetic recording medium in which the subbing layer comprises a polyurethane or polyester containing at least one polar group selected from the group consisting of —SO$_3$H, —SO$_4$H, —OPO(OH)$_2$, and —PO(OH)$_2$ in an amount of $2 \times 10^{-4}$ eq/g or more, a magnetic recording medium in which the subbing layer comprises a polyester containing carboxyl group in an amount of $8 \times 10^{-4}$ eq/g or more, and a magnetic recording medium in which the subbing layer comprises a polyester having an acid value of 45 or more, and soluble in a weak alkali or low concentration alkaline aqueous solution.

The term "acid value" as used herein means the amount of potassium hydroxide in terms of required to neutralize acids contained in 1 g of the polymer. Specifically, the acid value is calculated from the amount of a potassium hydroxide solution with accurately known potencies required to titrate the acids.

Further, the subbing layer preferably comprises a polymer which exhibits an adhesion force of 30 g or more and is soluble in a weak alkali or low concentration alkaline aqueous solution. The adhesion force is a property inherently required for a subbing layer which adheres a nonmagnetic plastic support to a magnetic layer. These properties meet conflicting requirements: sufficient durability during normal use as magnetic recording medium and rapid peelability upon disposal.

The above mentioned magnetic layer has a void of 40% by volume or less, and preferably 1 to 40% by volume, and the subbing layer comprises a polymer soluble in a weak alkali or low concentration alkaline aqueous solution. This characteristic is necessary for the weak alkali or low concentration alkaline aqueous solution to penetrate the magnetic layer to reach the subbing layer. For this reason, the peeling mechanism of magnetic tapes essentially differs from that of photographic films. In other words, an alkaline aqueous solution does not penetrate an emulsion layer to reach a subbing layer in photographic films. Therefore, even if the subbing layer of the photographic film comprises a polymer having a high solubility in an alkaline aqueous solution, it is of no use in peeling. Thus, in the peeling of photographic films, the emulsion layer must be first dissolved.

Further, the above mentioned subbing layer preferably comprises a polymer which exhibits a glass transition temperature (Tg) of 30° to 100° C. and soluble in a weak alkali or low concentration alkaline aqueous solution. This characteristic is effective for the inhibition of stain upon calendering. If Tg falls below 30° C., blocking or adhesion tends to occur. If Tg exceeds 100° C., the subbing layer tends to become brittle, causing poor adhesion.

The present invention also provides a process for recovery and processing of a magnetic recording medium, which process comprises the steps of: (1) cutting a magnetic recording medium comprising on a nonmagnetic plastic support having thereon a magnetic layer having a void of 40% by volume or less, (2) dipping pieces of the magnetic recording medium in a weak alkali having an initial pH of less than 13 or a low concentration alkaline aqueous solution having 0.25N or less with stirring so that a subbing layer in the pieces comprising a polymer having higher solubility in an alkaline aqueous solution than that in water is dissolved therein to peel off the magnetic layer from the nonmagnetic plastic support, and (3) separating these solid materials (i.e., the magnetic layer and the nonmagnetic plastic support from each other). This is a so-called batch-wise peeling process. The above mentioned weak alkali or low concentration alkaline aqueous solution is a weak alkali having an initial pH less than 13 or a low concentration alkaline aqueous solution having a concentration of 0.25N or less, such as an aqueous solution of NaOH having a concentration of 1% by weight.

The present invention further provides a process for recovery and processing of a magnetic recording medium, which process comprises the steps of: (1) passing a belt-shaped or tape-shaped magnetic recording medium comprising a nonmagnetic plastic support having thereon a magnetic layer having a void of 40% by volume or less, and a subbing layer comprising a polymer having higher solubility in an alkaline aqueous solution than that in water at a peel rate that the subbing layer is dissolved through a tank containing a weak alkali having an initial pH of less than 13 or a low concentration alkaline aqueous solution having 0.25N or less, and (2) peeling off the magnetic layer from the nonmagnetic plastic support by means of a scraper with the magnetic recording medium being washed with a cleaning fluid, while the magnetic recording medium is being conveyed along a predetermined running path. This is a so-called continuous peeling process.

The present invention is accomplished based on the results of the study of the characteristics of the magnetic layer in the magnetic recording media. Paying attention to the fact that unlike the case of photographic films, an alkaline aqueous solution penetrates a magnetic layer having a great void to attack the polymer in the subbing layer, it is found that a magnetic recording medium extremely excellent in environmental protection can be provided by incorporating in the subbing layer a polymer having a high solubility in an alkaline aqueous solution.

In the present invention, with such an arrangement that a subbing layer having a high peel rate such that it is dissolved in an aqueous solution of NaOH having as low concentration as 0.5 wt % at as low temperature of 40° C. in 3 minutes or less with stirring is provided on a nonmagnetic plastic support, the peeling of a magnetic layer and/or backing layer can be extremely easily effected, extremely facilitating the recovery of polyethylene terephthalate or polyethylene naphthalate. Further, the above mentioned subbing layer preferably comprises a polymer having such an extremely high solubility that it is dissolved in 50 g of a 0.5 wt % aqueous solution of NaOH at a temperature of 40° C. in an amount of at least 1 g as calculated in terms of solid content in 5 minutes so that conflicting requirements, i.e., adhesion and peeling, can be met at the same time. Thus, a magnetic recording medium which has heretofore been impossible can be obtained.

In the present invention, the peeling and recovery of a base film can be extremely easily made possible with a weak alkali or low concentration alkaline aqueous solution by employing designs which have been heretofore impossible in the field of magnetic recording medium, i.e., incorporation of a large amount of water-soluble groups, use of a binder having a high acid value, and consideration of the void in the magnetic layer. In the present invention, the magnetic layer must have a void of 40% by volume or less. The weak alkali or low concentration alkaline aqueous solution penetrates the magnetic layer through these voids to dissolve the subbing layer. The present invention can be applied to any magnetic layer having sufficient void, such as audio tapes, video tapes and floppy disks. In the case of vacuum-deposited magnetic layer efficient peeling can be conducted by cracking the magnetic layer before peeling.

In the present invention, a subbing layer which can be easily dissolved by processing with an alkali without deteriorating the adhesion can be obtained, for example, by using as primer a polymer containing carboxyl group in an amount of $2 \times 10^{-4}$ eq/g or more. It is preferred that the amount of carboxyl group in the polymer be in the range of $2 \times 10^{-4}$ eq/g or more, preferably $3 \times 10^{-3}$ eq/g or more, and the acid value of the subbing layer be in the range of 13 or more. If these values fall below the above defined ranges, the resulting peelability tends to be poor. Examples of the polymer containing carboxylic group include carboxylic vinyl ester, copolymer of phthalic anhydride, etc.

The above copolymers used in the present invention may be copolymerized with other copolymerizable monomers. Examples of such copolymerizable monomers include vinyl monomer and diene monomer. Examples of vinyl monomer include vinyl carboxylates, alkyl vinyl ethers, styrene, acrylonitrile, methyl acrylate, methyl methacrylate, ethyl acrylate, ethyl methacrylate, propyl acrylate, butyl acrylate, butyl methacrylate, hydroxyethyl acrylate, hydroxyethyl methacrylate, acrylamide, methacrylamide, vinyl chloride, vinylidene chloride, ethylene and propylene. Examples of vinyl carboxylate include vinyl acetate and vinyl propionate. Examples of alkyl vinyl ether include methyl vinyl ether and ethyl vinyl ether. Examples of diene monomer include butadiene, isoprene and chloroprene. The preferred weight average molecular weight of such a copolymer is in the range of 10,000 to 200,000, more preferably 20,000 to 100,000. If it exceeds the above defined range, the resulting solution viscosity tends to be too high for easy coating. If it falls below the above defined range, the resulting adhesion tends to be insufficient.

The above copolymers used in the present invention may be copolymerized with other copolymerizable monomers. Examples of such copolymerizable monomers include vinyl monomer and diene monomer. Examples of vinyl monomer include vinyl carboxylates (such as vinyl acetate and vinyl propionate), styrene, acrylonitrile, methyl acrylate, methyl methacrylate, ethyl acrylate, ethyl methacrylate, propyl acrylate, butyl acrylate, butyl methacrylate, hydroxyethyl acrylate, hydroxyethyl methacrylate, acrylamide, methacrylamide, vinyl chloride, vinylidene chloride, ethylene and propylene. Examples of diene monomer include butadiene, isoprene and chloroprene. The preferred weight average molecular weight of such a copolymer is in the range of 10,000 to 200,000, more preferably 20,000 to 100,000. If it exceeds the above defined range, the resulting solution viscosity tends to be too high for easy coating. If it falls below the above defined range, the resulting adhesion tends to be insufficient.

In the present invention, a subbing layer that can be easily dissolved by processing with an alkali without deteriorating the adhesion can also be obtained by using as primer a polymer containing as components maleic anhydride and copolymerizable monomers. The preferred copolymerization ratio of maleic anhydride is in the range of 10 wt % or more, and more preferably 30 wt % or more. If it falls below the above defined range, the resulting adhesion between the support and the magnetic layer and/or back layer tends to be poor, causing deterioration in the running durability of tapes. Further, the resulting peelability of the base film from the magnetic layer and/or back layer during processing with a weak alkali or low concentration alkaline aqueous solution tends to be poor.

The above copolymers used ill the present invention may be copolymerized with other copolymerizable monomers. Examples of such copolymerizable monomers include vinyl monomer and diene monomer. Examples of vinyl monomer include vinyl carboxylates (such as vinyl acetate and vinyl propionate), styrene, acrylonitrile, methyl acrylate, methyl methacrylate, ethyl acrylate, ethyl methacrylate, propyl acrylate, butyl acrylate, butyl methacrylate, hydroxyethyl acrylate, hydroxyethyl methacrylate, acrylamide, methacrylamide, vinyl chloride, vinylidene chloride, ethylene and propylene. Examples of diene monomer include butadiene, isoprene and chloroprene. The preferred weight average molecular weight of such a copolymer is in the range of 10,000 to 200,000, more preferably 20,000 to 100,000. If it exceeds the above defined range, the resulting solution viscosity tends to be too high for easy coating. If it falls below the above defined range, the resulting adhesion tends to be insufficient.

In the present invention, a subbing layer which can be easily dissolved in a weak alkali or low concentration alkaline aqueous solution without deteriorating the adhesion can be obtained by using as primer a polyurethane containing a carboxyl group in an amount of $8 \times 10^{-4}$ eq/g or more. The reason why a polyurethane is used is that a polyurethane provides a film having excellent mechanical properties and high toughness. Such a subbing layer is not subject to scraping by a upon coating of a magnetic coating thereon.

The polyurethane used in the present invention can be prepared from a polyol containing carboxyl group or its salt, diisocyanate and optionally a chain extender by a known polyurethane preparation method. Examples of such a polyol containing carboxyl group or its salt include polyether polyol, polyester polyol, polycarbonate diol and polycaprolactone diol containing carboxyl group or its salt connected to its main chain or side chain. Examples of such a polyether polyol include polyalkylene glycol such as polyethylene glycol and polypropyrene glycol. The above mentioned polyester polyol can be synthesized by the polycondensation of a divalent alcohol and a dibasic acid, the ring opening of a lactone such as caprolactone, etc.

Examples of divalent alcohol include glycol such as ethylene glycol, propylene glycol, butanediol, 1,6-hexanediol and cyclohexanedimethanol. Examples of dibasic acid include adipic acid, pimelic acid, azelaic acid, sebacic acid, phthalic acid and terephthalic acid.

Polycarbonate polyol that can be used in the present invention can be represented by formula (1):

$$HO-R^1-OH \qquad (1)$$

wherein $R^1$ represents $-(CH_2)_n-$,

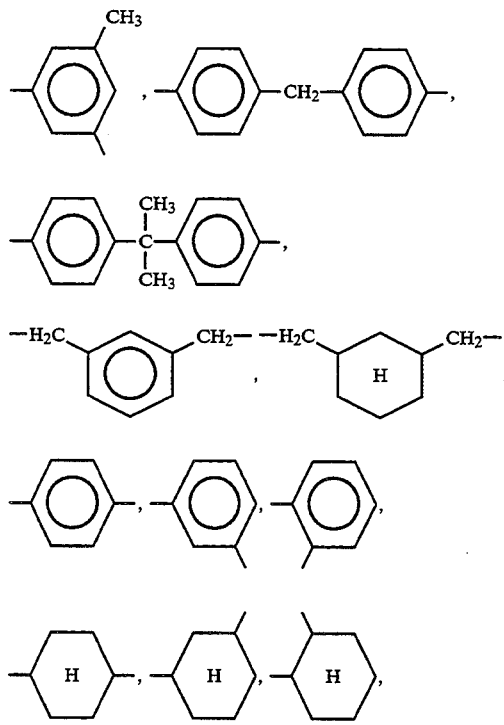

etc., wherein n represents an integer of from 3 to 14.

A polycarbonate polyol represented by formula (1) with a molecular weight of 300 to 20,000 and a hydroxyl value of 20 to 300 can be synthesized by condensation or ester interchange of a polyvalent alcohol with phosgene, ester chloroformate and dialkyl carbonate. Further, a polycarbonate polyester polyol with a molecular weight of 400 to 30,000 and a hydroxyl value of 5 to 300 can be obtained by condensation of the polycarbonate polyol with a divalent carboxylic acid represented by the general formula $HOOC-R^2-COOH$ in which $R^2$ represents a $C_{3-6}$ alkylene group or 1,4-, 1,3- or 1,2-cyclohexylene group.

The above mentioned polyol may be used in combination with other polyols such as polyether polyol, polyester ether polyol and polyester in an amount of 90% by weight or less based on the amount of the above mentioned polyol.

The diol containing carboxyl group or its diol may be obtained by incorporating dimethylolpropionic acid, dimethylolbutyric acid, dimethylolvaleric acid, etc. in the above mentioned polyol. Alternatively, these compounds may be directly used as low molecular polyols.

Polyisocyanates to be reacted with the above mentioned polyol to form a polyurethane are not specifically limited. As such polyisocyanates, there may be used those commonly used. Examples of such polyisocyanates include hexamethylene diisocyanate, tolylenediisocyanate, isophoronediisocyanate, 1,3-xylylenediisocyanate, 1,4-xylylenediisocyanate, cyclohexanediisocyanate, toluidinediisocyanate, 2,4-tolylenediisocyanate, 2,6-tolylenediisocyanate, 4,4'-diphenylmethanediisocyanate, p-phenylenediisocyanate, m-phenylenediisocyanate, 1,5-naphthylenediisocyanate, 3,3-dimethylphenylenediisocyanate and dicyclohexylmethanediisocyanate.

Examples of the chain extenders include the above mentioned polyvalent alcohol, aliphatic polyamine, polycyclic polyamine, and aromatic polyamine. The polyurethane used in the present invention preferably contains carboxyl group or its salt in an amount of $8 \times 10^{-4}$ eq/g or more, more preferably $15 \times 10^{-4}$ eq/g or more, in order to make itself easily soluble in a weak alkali or low concentration alkaline solution. Further, as polyol, there may be preferably used a compound having a high hydrophilicity such as polyethylene glycol.

The preferred weight average molecular weight of the polyurethane is in the range of 10,000 to 200,000, and more preferably 20,000 to 100,000. If it exceeds the above defined range, the resulting solution viscosity tends to be too high for easy coating. If it falls below the above defined range, the resulting adhesion tends to be insufficient.

The polyurethane used in the present invention is preferably one containing at least those polar group selected from the group consisting of $-SO_3M$, $-SO_4M$, $-OPO(OM)_2$ and $-PO(OM)_2$ in which M represents a hydrogen atom, an alkaline metal or an ammonium group in an amount of $2 \times 10^{-4}$ eq/g or more.

The polyurethane used in the present invention can be prepared from a polyol containing a polar group, diisocyanate and optionally a chain extender by a known polyurethane preparation method. Examples of such a polyol containing a polar group include compounds comprising a polyol such as polyether polyol, polyester polyol, polycarbonate diol and polycaprolactone diol containing a polar group connected to its main chain or side chain.

Examples of the polyether polyol include polyalkylene glycol such as polyethylene glycol and polypropyrene glycol. The above mentioned polyester polyol can be synthesized by the polycondensation of a divalent alcohol and a dibasic acid, the ring open polymerization of a lactone such as caprolactone, etc. Typical examples of divalent alcohol include glycol such as ethylene glycol, propylene glycol, butanediol, 1,6-hexanediol and cyclohexanedimethanol. Typical examples of dibasic acid include adipic acid, pimelic acid, azelaic acid, sebacic acid, phthalic acid, and terephthalic acid.

In the present invention, the subbing layer may comprise a polyester containing carboxyl group or its salt in an amount of $8 \times 10^{-4}$ eq/g or more or a polyester having an acid value of 45 or more. The polyester preferably contains carboxyl group, a part of which may be salts, in an amount of $8 \times 10^{-4}$ eq/g or more, and more preferably $30 \times 10^{-4}$ eq/g or more. If it falls below the above defined range, the resulting peelability tends to be poor. Examples of salts of carboxyl group include Li, Na, K, Ca, ammonium, and quaternary amine salt.

The incorporation of carboxyl group in the polyester resin can be accomplished by the following methods:

(1) The polyester used in the present invention can be prepared by incorporating carboxyl group or its salt in a polyol, dibasic acid, etc. as starting material and then subjecting the material to any known polyester preparation process.

As such a polyol as starting material there can be used an ordinary aliphatic or aromatic polyvalent alcohol or a polyol such as polyetherdiol, polyesterdiol, polycarbonatediol and polycaprolactonediol. Examples of the polyol containing carboxyl group or its salt include dimethylolpropionic acid, dimethylolbutyric acid and dimethylolvaleric acid.

As a polybasic acid as starting material there can be used an ordinary trimellitic anhydride, pyromellitic anhydride or the like. The polybasic acid can be branched during the preparation of a polyester but can be used so long as the solubility thereof permits.

(2) It is possible to employ a process which comprises modification of an $-OH$ group-containing polyester resin having bifunctionality or higher functionality.

For example, the modification process can be represented by the following reaction formula

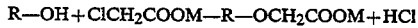

in which R represents a polyester residue, and M represents Li, Na, K, Ca, ammonium or quaternary amine.

The polyester resin can be synthesized from a dibasic acid and glycol. The dibasic acid component to be contained in the polyester resin of the present invention can be selected from the group consisting of aromatic dicarboxylic acid such as terephthalic acid, isophthalic acid, orthophthalic acid and naphthalenedicarboxylic acid, aliphatic dicarboxylic acid such as succinic acid, adipic acid and sebacic acid and alicyclic dicarboxylic acid. Preferred among these dicarboxylic acids are aromatic dicarboxylic acid such as terephthalic acid, isophthalic acid and naphthalenedicarboxylic acid.

As glycol component, there can be used an aliphatic, alicyclic or aromatic glycol such as ethylene glycol, diethylene glycol, triethylene glycol, tetraethylene glycol, propylene glycol, butanedien, neopentyl glycol, hexanediol, cyclohexanediol, cyclohexanedimethanol and hisphenol A. Preferred among these glycol components are ethylene glycol and diethylene glycol.

Further, a polyester resin, a carboxyl group-containing acrylic resin, and an $-SO_3$ group-containing polyester resin can be used in combination to meet both adhesion and peelability requirements. The polyester used in the present invention preferably contains a polar group in an amount of $8 \times 10^{-4}$ eq/g or more, more preferably $15 \times 10^{-4}$ eq/g or more, in order to make itself easily soluble in a weak alkali or low concentration alkaline solution Further, as the polyol there may be preferably used a compound having a high hydrophilicity such as polyethylene glycol. The content of carboxyl group or its salt depends on the charged amount of the polyol in the synthesis of polyester. The term "acid value" as used herein means the amount of potassium hydroxide in mg required to neutralize free aliphatic acids contained in 1 g of polyester. The preferred weight average molecular weight of such a polyester is in the range of 10,000 to 200,000, and more preferably 20,000 to 100,000. If the molecular weight exceeds this range, the resulting solution viscosity tends to be too high for easy coating. If the molecular weight falls below this range, the resulting adhesion tends to be insufficient.

The thickness of the subbing layer of the present invention is preferably in the range of 0.01 to 5 μm, and more preferably 0.01 to 0.5 μm. If it exceeds this range, it can adversely affects the smoothness of the magnetic layer. If it falls below this range, it can give insufficient adhesion. In view of peeling, the subbing layer is preferably uniform. If there are portions on which no subbing layer is coated, peeling cannot be sometimes effected during the peeling process. Therefore, the subbing layer may be as thin as possible but is preferably uniform.

The preferred weight average molecular weight of the polymer used in the subbing layer is in the range of 10,000 to 100,000, and more preferably 30,000 to 60,000. If the content of the polar group or the molecular weight of the polymer is too high, it may be difficult to dissolve the resin in an organic solvent, making it impossible to coat a coating solution in an organic solvent and thus giving a disadvantage in manufacture.

The preferred Tg of the resin is in the range of 30° to 100° C., and more preferably 40° to 80° C. If Tg is too low, blocking can occur during the production process.

The peeling and recovery process of the present invention will be described hereinafter. Both batch-wise and continuous peeling and recovery processes can be applied. The batch-wise peeling and recovery process comprises the steps of cutting, peeling and separation of a magnetic recording medium. In particular, the magnetic recording medium recovery process comprises cutting a magnetic recording medium comprising on a nonmagnetic plastic support having thereon a magnetic layer having a void of 40% by volume or less, dipping the pieces in a weak alkali or low concentration alkaline solution with stirring so that the above mentioned subbing layer in the pieces is dissolved therein to peel off the magnetic layer from the nonmagnetic plastic support, and then separating these solid matters including the magnetic layer and the support.

As cutting means, there can be used any ordinary cutter such as rotary cutter, slit cutter, guillotine cutter and shredder. The term "weak alkali or low concentration alkaline solution" as used herein means an alkaline aqueous solution such that it does not hydrolyze PET. As such an aqueous solution, there can be used any aqueous solution. For example, an aqueous solution containing sodium carbonate, sodium bicarbonate, ammonium carbonate, sodium phosphate, pyridine and triethanolamine can be used. Any low concentration alkaline solution containing caustic soda, caustic potash or the like in an amount such that it does not hydrolyze PET can be used. Further, hydroxides, oxides and carbonates of alkaline earth metal (e.g., Ca), tertiary amine aqueous solution, etc. may be used. However, in view of after-treatment, water or a mixture of water and other solvents is preferred. As a solvent for aqueous solution there can be used water or an organic solvent such as ethanol, acetone, dioxane and THF or mixture thereof. Most preferred among these solvents is water.

The above mentioned weak alkali or low concentration alkaline aqueous solution may be an aqueous solution having an initial pH of less than 13 or an initial concentration of 0.25N or less, specifically 1 wt % or less NaOH solution, and needs to dissolve the subbing Layer at a temperature of 40° C.

As dipping and stirring tank, there can be used any ordinary tank. A tank equipped with agitator such as turbine or Henschel type or dissolver type mixer can be used as strong stirrer.

The processing temperature is generally in the range of room temperature to 100° C., and preferably 40° to 100° C. If the processing temperature falls below room temperature, the resulting peel rate tends to be too low. If the processing temperature exceeds 100° C., the polyester film tends to be dissolved or hydrolyzed. When subjected to processing with an aqueous solution, waste magnetic tapes can be cut, crushed or otherwise processed so that they can be properly shaped for the subsequent processing.

The processing time can be arbitrarily altered depending on the type and shape of the magnetic recording medium to be processed and the concentration and temperature of the weak alkali or low concentration alkaline substance and can be determined such that peeling can be effectively made and the dissolution and hydrolyzation of PET can be minimized.

As separation means, porous plate, metal gauze or the like can be sued. If separation can be difficultly effected by the above means, magnetic separation or separation by difference in specific gravity can be employed. In the latter separation process, a mixing tank equipped with a heater and a rotary blade provided therein are rotated so that the base and magnetic powder are separated from each other, the base floating and the magnetic powder settling down. In this arrangement, the mixing tank is partitioned by a porous plate such as a punching metal. The neutralization point is preferably at pH 5.5 to 7.0.

A continuous peeling and recovery process can alternatively be employed. For example, process for recovery and processing of a magnetic recording medium can be used which comprises passing a belt-shaped or tape-shaped magnetic recording medium comprising a nonmagnetic plastic support having thereon a magnetic layer having a void of 40% by volume or less through a tank containing a weak alkali or a low concentration alkaline aqueous solution, and then peeling off the magnetic layer from the nonmagnetic plastic support by means of a scraper with the magnetic recording medium being washed with a cleaning fluid, while the magnetic recording medium is being conveyed along a predetermined running path.

As the washing fluid, water is preferably used. The scraper may be made of plastic such as polypropylene and polyethylene or metal such as SUS. The scraper is preferably an edged plate in form. The conveying speed is preferably in the range of 20 to 300 m/min. The plastic support thus recovered may be then dried with hot air. The air flow can be properly altered depending on the tape width, the conveying speed and the temperature.

The magnetic recording medium of the present invention has a basic structure comprising a nonmagnetic plastic support, a subbing layer provided on the support and a magnetic layer provided on the subbing layer. The magnetic layer used in the present invention comprises, for example, a ferromagnetic powder dispersed in a binder or a thin ferromagnetic metal film formed by tilted vacuum deposition.

The nonmagnetic plastic support used in the present invention can be selected from various synthetic resin films such as polyethylene terephthalate (PET), polyethylene naphthalate (PEN), polypropylene, polycarbonate, polyamide, polyaromatic amide (aramide), polyimide and polyamideimide. Preferred among these synthetic resins are polyethylene terephthalate, polyethylene naphthalate, polyamide, polyaromatic amide (aramide), polyimide, and polyamideimide. The thickness of the nonmagnetic plastic support is generally in the range of 2.5 to 100 μm, and preferably 3 to 80 μm.

The magnetic layer used in the present invention generally has the following structure. In the case of ferromagnetic powder coating type magnetic recording medium, the composition of ferromagnetic powder (iron oxide, cobalt-containing iron oxide, alloy containing iron as main component, barium ferrite), the size and surface treatment of the ferromagnetic powder to be used are not particularly limited. The shape of the ferromagnetic powder is not particularly limited and is generally needle, grain, cube, rise grain, tablet or the like. Examples of the ferromagnetic powder include those disclosed in JP-A-58-119609 (U.S. Pat. No. 4,455,345), JP-A-60-171631, JP-A-61-8726 (U.S. Pat. No. 4,690,863), JP-A-61-16024, JP-A-JP-A-61-158023, JP-A-63-78334, JP-A-63-103423, JP-A-1-187903, and JP-A-1-189025.

As binder to be used in the formation of the magnetic layer in the present invention there can be selected from ordinary binders. Examples of binders include a vinyl chloride copolymer, a vinyl chloride-vinyl acetate copolymer, a copolymer of vinyl chloride or vinyl acetate with at least one of vinyl alcohol, a maleic acid and acrylic acid, a vinyl chloride-vinylidene chloride copolymer, a vinyl chloride-acrylonitrile copolymer, an ethylene acetate-vinyl copolymer, a cellulose derivatives such as a nitrocellulose resin, an acrylic resin, a polyvinyl acetal resin, a polyvinyl butyral resin, an epoxy resin, a phenoxy resin, a polyurethane resin and a polycarbonate polyurethane resin. In order to further improve dispersibility and durability, these binders may preferably comprise at least one polar group selected from the group consisting of —COOM, —$SO_3M$, —$PO_3M_2$, —$OSO_3M$ and —$OPO_3M_2$ (in which M represents a hydrogen atom, alkaline metal salt or ammonium salt) or an epoxy group incorporated in its molecule. When there are a plurality of groups represented by M, they may be the same or different. The content of the polar group is preferably in the range of $10^{-5}$ to $10^{-4}$ equivalent per g of polymer. These high molecular weight binders can be used singly or in admixture. The binder may be often cured with the addition of a known isocyanate cross-linking agent.

The subbing layer of the present invention can be also applied to a magnetic recording medium using a binder comprising acrylic ester oligomer and monomer which is subjected to curing by irradiation.

The total content of binders in the magnetic layer in the magnetic recording medium of the present invention is generally in the range of 10 to 60 parts by weight, preferably 20 to 40 parts by weight, per 100 parts by weight of ferromagnetic powder.

Examples of the binders include those disclosed in JP-A-59-8127, JP-A-61-123017, JP-A-62-33329, JP-A-62-146432, JP-A-1-205721, JP-A-1-205724, JP-A-3-44819, and JP-B-3-18247.

The magnetic recording medium of the present invention may preferably further contain inorganic particles having a Mohs hardness of 5 or more. The inorganic particles used in the present invention are not particularly limited so long as they exhibit a Mohs hardness of 5 or more. Examples of inorganic particles having a Mohs hardness of 5 or more include $Al_2O_3$ (Mohs hardness: 9), $TiO_2$ (Mohs hardness: 5), TiO (Mohs hardness: 6.5), $SiO_2$ (Mohs hardness: 7), $SnO_2$ (Mohs hardness: 6.5), $Cr_2O_3$ (Mohs hardness: 9), and $\alpha$-$Fe_2O_3$ (Mohs hardness: 5.5). These inorganic particles may be used singly or in admixture. Examples of the inorganic particles include those disclosed in JP-A-57-6439, JP-A-62-134827 (U.S. Pat. No. 4,761,243), JP-A-1-106332, JP-A-1-140421, 1-205726, and JP-A-1-220219.

In particular, inorganic particles having a Mohs hardness of 8 or more may be preferably used. If inorganic particles having a Mohs hardness of less than 5 are used, they can fall off from the magnetic layer. Such inorganic particles exhibit little or no polishing effect, easily causing clogging of head and deteriorating running durability.

The content of the inorganic particles is generally in the range of 0.1 to 20 parts by weight preferably 1 to 10 parts by weight, per 100 parts by weight of ferromagnetic powder.

The magnetic layer may preferably further contain carbon black (particularly having an average diameter of 10 to 300 nm (nano meter=$10^{-9}$ m) besides the above mentioned inorganic particles. Examples of the carbon black include those described in JP-A-59-75431, JP-A-59-172123, JP-A-1-243227, and JP-A-3-8113.

Examples of the process for the preparation of the magnetic recording medium of the present invention will be described hereinafter. First, the subbing layer is coated on a nonmagnetic plastic support. The polymer for the subbing layer is coated on the support in the form of solution in a proper solvent such as cyclohexanone, MEK, acetone, methyl isobutyl ketone (MIBK) and butyl acetate. The coating can be accomplished by conventional means. In generally processes for the coating of a subbing layer, a rod coater (forward or reverse), a wire bar coater (forward or reverse), a blade coater, a curtain coater, an extrusion coater, a gravure coater, a kiss-roll coater, etc. can be used. Particularly preferred among these coaters are a rod coater (reverse) and art extrusion coater.

The ferromagnetic powder and the binder as well as other optional fillers and additives are then kneaded with a solvent to prepare a magnetic coating composition. As solvent to be used in kneading, there can be used any solvent which is commonly used for the preparation of a magnetic coating composition. The process for the kneading of these components is not particularly limited. The order of addition of these components can be properly determined. For example, a binder, a solvent and a ferromagnetic powder are previously kneaded in admixture, and a curing agent solution is then added to the mixture. Alternatively, a lubricant may be finally added to the system in the form of solution.

In the preparation of a magnetic coating composition, known additives such as a dispersant, an antistatic agent and a lubricant can be used in combination.

Examples of dispersant include a $C_{12-22}$ aliphatic acid, salts and ester compounds thereof, compounds obtained by partially or entirely substituting for hydrogen atoms therein with fluorine atoms, and known dispersants such as amide of the above mentioned aliphatic acid, aliphatic amine, higher alcohol, polyalkylene oxide alkylphosphoric ester, alkylphosphoric ester, alkylboric ester, sarcosinate, alkyl ether ester, trialkyl polyolefin, oxy quaternary ammonium salt and lecithin. If such a dispersant is used, its content is generally in the range of 0.1 to 10 parts by weight per 100 parts by weight of ferromagnetic powder.

Examples of antistatic agent include finely divided powder of electrically conductive material such as carbon black and carbon black graft polymers, natural surface active agents such as saponin, cationic surface active agents such as higher alkylamine, quaternary ammonium salt, pyridine, other heterocyclic compound, phosphonium and sulfonium, anionic surface active agents containing acid groups such as carboxylic acid, phosphoric acid, sulfuric ester group and phosphoric ester group, and amphoteric surface active agents such as amino acid, aminosulfonic acid and sulfuric or phosphoric ester of amino alcohol. If the above mentioned finely divided powder of electrically conductive material is used as an antistatic agent, it is generally used in an amount of 0.1 to 10 parts by weight per 100 parts by weight of ferromagnetic powder. If the above mentioned surface active agent is used, it is generally used in an amount of 0.12 to 10 parts by weight per 100 parts by weight of ferromagnetic powder.

The above mentioned additives such as dispersants, antistatic agents and lubricants have not been described on the basis of definition that they have only the above defined functions. For example, the dispersant can serve as a lubricant or an antistatic agent. Therefore, the effectiveness of the above classified compounds are not limited to those defined above. If a substance having a plurality of effects is used, its added amount is preferably determined taking into account its effects.

The magnetic coating composition thus prepared is then coated on the subbing layer coated on the nonmagnetic plastic support. The dry thickness of the magnetic layer thus formed is generally in the range of 0.1 to 10 $\mu$m. The magnetic recording medium of the present invention may be of the plural layer type having a plurality of magnetic layers. Examples of such a magnetic recording medium include those described in JP-A-57-143734, JP-A-61-214223, JP-A-2-110823, JP-A-2-158913, and JP-A-2-254627. In the plural type magnetic recording medium, the lower magnetic layer may be replaced with a lower nonmagnetic layer.

Further, a backing layer may be provided on the other side of the nonmagnetic plastic support from the magnetic layer. In this case, the subbing layer is preferably provided between the nonmagnetic plastic support and the backing layer. The dry thickness of the backing layer is generally in the range of 0.1 to 2 $\mu$m, and preferably 0.3 to 1 $\mu$m.

As material for backing layer, any known suitable materials can be used. Examples of such a material include those disclosed in JP-A-60-5417, JP-A-60-38725, JP-A-60-229227, JP-A-61-273722, JP-B-2-62894 and JP-B-3-12370.

The process for dispersing the above mentioned ferromagnetic powder and binder and the process for coating the magnetic coating composition on the nonmagnetic plastic support are further described in JP-A-54-46011, JP-A-54-21805, JP-A-57-130234 (U.S. Pat. No. 4,414,270), JP-A-57-150130 (U.S. Pat. No. 4,496,626), JP-A-58-200423, JP-A-60-38725 (U.S. Pat. No. 4,582,757), JP-A-60-76023, JP-A-62-60748, JP-A-62-214524, JP-A-62-298927 and JP-A-2-17971.

The magnetic layer coated on the nonmagnetic plastic support, if the magnetic recording medium is used in the form of tape, is generally subjected to magnetic orientation of the ferromagnetic powder in the magnetic layer, and then dried. On the other hand, if the magnetic recording medium is in the form of disk, the magnetic layer is then subjected to unorientation by magnetic field to remove magnetic anisotropy. The materials are then optionally subjected to a surface smoothening treatment.

The present invention will be further described in the following examples, but the present invention should not be construed as being limited thereto. All parts, ratios and the like in the examples are by weight unless otherwise indicated.

EXAMPLE 1 AND COMPARATIVE EXAMPLE 1

The following composition was mixed and kneaded in by a ball mill for 48 hours, and then filtered through a filter with an average pore diameter of 1 $\mu$m to prepare a magnetic coating composition. The resin set forth in Table 1 was coated on the surface of a 10-$\mu$m thick polyethylene terephthalate nonmagnetic plastic support in the form of solution in a 8/2 mixture (by weight) of acetone and cyclohexanone to a dry thickness of 0.1 $\mu$m, and then dried. The magnetic coating composition was then coated on the layer thus obtained by a reverse roll to a dry thickness of 4 $\mu$m.

TABLE 1

| No. | Polymer structure of subbing layer | Weight-average molecular weight ($\times 10^4$) | Acid content ($\times 10^{-3}$ eq/g) | Acid value | Tg (°C.) | Subbing layer material solubility |
|---|---|---|---|---|---|---|
| 1 | $\begin{array}{cc} CH_3 & CH_3 \\ | & | \\ (CH_2C)_{60} & (CH_2C)_{40} \\ | & | \\ COOCH_3 & COOH \end{array}$ | 2 | 3.98 | 223 | 85 | O |
| 2 | $\begin{array}{cc} (CHCH)_{50} & (CH_2CH)_{50} \\ | & | \\ OCOOCH_3 & COOH \\ | & \\ OH & \end{array}$ | 2 | 4.95 | 227 | 80 | O |

TABLE 1-continued

| No. | Polymer structure of subbing layer | Weight-average molecular weight ($\times 10^4$) | Acid content ($\times 10^{-3}$ eq/g) | Acid value | Tg (°C.) | Subbing layer material solubility |
|---|---|---|---|---|---|---|
| 3 | $CH_3$<br>\|<br>$(CH_2C)_{15}$   $(CH_2CH)_{85}$<br>\|                \|<br>$COOC_4H_9$    $COOH$ | 2 | 10.5 | 588 | 90 | O |
| 4 | $(CH_2CH)_{70}$   $(CH_2CH)_{30}$<br>\|              \|<br>$COOCH_3$    $COOH$ | 2 | 2.68 | 150 | 40 | O |
| 5 | FUJI FILM "STAFIX" | 2 | — | — | 28 | X |
| 6 | None | — | — | — | — | — |
| 7 | $CH_3$<br>\|<br>$(CH_2C)_{97}$   $(CH_2CH)_3$<br>\|                \|<br>$COOC_4H_9$    $COOH$ | 2 | 0.23 | 13 | 8 | O |
| 8 | $CH_3$<br>\|<br>$(CH_2C)_{98}$   $(CH_2CH)_2$<br>\|                \|<br>$COOC_4H_9$    $COOH$ | 2 | 0.21 | 12 | 8 | X |
| 9 | $(CH_2CH)_{90}$   $(CH_2CH)_{10}$<br>\|              \|<br>$COOC_4H_9$    $COOH$ | 2 | 0.81 | 45 | 20 | O |
| 10 | $(CHCH)_{50}$ $(CH_2CH)_{50}$<br>\|   \|              \|<br>O=C C=O         O<br>   \\ /              \|<br>    O               CO<br>                    \|<br>                    $CH_3$ | 3.2 | — | — | 100 | O |
| 11 | $(CHCH)_{40}$ $(CH_2CH)_{40}$ $(CH_2CH)_{20}$<br>\|   \|              \|              \|<br>O=C C=O         O              CO<br>   \\ /              \|              \|<br>    O               CO            O<br>                    \|              \|<br>                    $CH_3$       $C_4H_9$ | 3.2 | — | — | 80 | O |
| 12 | $(CHCH)_{40}$ $(CH_2CH)_{40}$ $(CH_2CH)_{20}$<br>\|   \|              \|              \|<br>O=C C=O         O              CO<br>   \\ /              \|              \|<br>    O               CO            O<br>                    \|              \|<br>                    $CH_3$       $C_4H_9$ | 3.2 | — | — | 70 | O |
| 13 | (Polyester (phthalic acid/ethyleneglycol/ neopentyl glycol) | 4 | — | — | 20 | X |
| 14 | None | — | — | — | — | — |

| Composition of magnetic coating composition | (parts by weight) |
|---|---|
| Ferromagnetic alloy powder (formulation: Fe 94%; Zn 4%; Ni 2%; Hc: 1,500 Oe; BET specific surface area: 54 m²/g) | 100 |
| Polyester polyurethane (weight-average molecular weight: 40,000; number-average molecular weight: 25,000; two SO₃Na groups on average per molecule) | 5 |
| Vinyl chloride copolymer ("MR110" available from Nippon Zeon K.K.; polymerization degree: 320; containing SO₃K group, epoxy group, OH group) | 12 |
| Abrasive (α-alumina, average particles diameter: 0.3 μm) | 5 |
| Stearic acid | 1 |
| Oleic acid | 1 |
| Butyl stearate | 2 |
| Carbon black (average particles diameter: 40 nm) | 2 |
| Methyl ethyl ketone | 200 |
| Cyclohexanone | 100 |

The nonmagnetic plastic support having a magnetic layer coated thereon was subjected to magnetic orientation by a magnet with 3,000 gauss while the magnetic layer was wet. After drying, the material was subjected to a supercalender treatment. The material was then slit into 8-mm wide strips to prepare a video tape. The magnetic layer thus formed had a void of 18% by volume.

The tape specimen thus obtained was then subjected to the following tests, The results are set forth in Table 2.

Test 1: Adhesion Strength of Magnetic Layer

An adhesive tape ("Scotch Splicing Tape" produced by 3M Corp.) was fixed on the surface of a glass plate in such a manner that the adhesive surface thereof faced upward. On the adhesive surface of the adhesive tape, the tape specimen was put in such a manner that the surface of the magnetic layer faced downward. The tape specimen was then pulled in longer direction at a temperature of 23° C. and a relative humidity of 50%. A spring scale was used to measure the adhesion strength (gf). The pulling rate adjusted such that a 8 mm video tape available from Fuji Photo Film Co,, Ltd. ("SUPER AG SLIM") exhibits 50 gf per 8 mm width,

Test 2: Powder Falling From Magnetic Layer Due to Running

The tape specimen was subjected to 200 repetitive running in a VTR ("FUJIX8" produced by Fuji Photo Film Co., Ltd.) at a temperature of 23° C. and a relative humidity of 5% and then examined for the presence of powder falling from the edge thereof, Those showing powder falling are marked by X while those showing no powder falling are marked by O.

Test 3: Peelability of Magnetic Layer: A

The tape specimen was dipped in a 0.1 wt % (0.009N) aqueous solution of $Na_2CO_3$ (pH: 10.8 as determined by the method as described later) at a temperature of 40° C. for 3 minutes at most, and then examined to see if the magnetic layer was peeled off from the nonmagnetic plastic support. Those showing peeling are marked by O while those showing no peeling are marked by X. Further, the time which had passed until the completion of peeling was also determined.

Test 4: Peelability of Magnetic Layer: B 100 g of the tape specimen (in the form of circle with a diameter of about 3 cm) was charged into 4 l of a 0.5 wt % (0,125N) aqueous solution of NaOH (pH: 12.4 as determined by the method as described later) in a beaker at a temperature of 40° C. and then stirred by an air motor stirrer available from Shibata Kagaku Kiki K. K. (with four 50-mm diameter agitating blades) at 500 rpm for 5 minutes at most. Those showing peeling are marked by O while those showing no peeling are marked by X. Further, the time which had passed until the completion of peeling was also determined.

Test 5: Peelability of Magnetic Layer: C 100 g of the tape specimen (in the form of circle with a diameter of about 3 cm) was charged into 4 l of a 0.5 wt % (1.25N) aqueous solution of NaOH (pH: 13.3 as determined by the method as described later) in a beaker at a temperature of 40° C. and then stirred by an air motor stirrer available from Shibata Kagaku Kiki K. K. (with four 50-mm diameter agitating blades) at 500 rpm for 2 hours at most. Those showing peeling are marked by O while those showing no peeling are marked by X. Further, the time which had passed until the completion of peeling was also determined.

Test 6: Peelability of Magnetic Layer: D

The same procedures were conducted as in Test 4 except that the tape specimen was charged into 4 l of water in a beaker at a temperature of 40° C. Those showing no peeling are marked by O while those showing peeling are marked by X.

Test 7: Peelability of Magnetic Layer: E

Molecular weight of recovered PET:
PET specimen was vacuum-dried at a temperature of 190° C. for 30 minutes, and then dissolved in a 6/4 mixture of phenol and tetrachloroethane to prepare 0.3%, 0.6% and 1% solutions. With the viscosity of the solution $\eta$ and the viscosity of the solvent $\eta_0$ as determined by an Ubbelohde viscometer at a temperature of 25° C., the intrinsic viscosity (I.V.=$\lim (\eta-\eta_0)/\eta_0$) was determined as substitute for the molecular weight.
Coloring:
About 50 g of PET specimen was measured out, formed by a hot press at a temperature of 200° C., and then visually checked for coloring.
O: No coloring on PET and no drop in molecular weight
Δ: No coloring on PET but slight drop in molecular weight
X: Coloring on PET and drop in molecular weight observed

Test 8: Solubility of Subbing Material In Alkaline Aqueous Solution 1 g of the solid content of the subbing layer material in the form of solid content is shaken in 50 g of a 0.5 wt % aqueous solution of NaOH (pH: 12.4 as determined by the method as described later) at a temperature of 40° C. in an incubator for 3 minutes. Those showing dissolution are marked by O while those leaving insoluble matters are marked by X.

Test 9: Void of Magnetic Layer

Measurement was effected in an $N_2$ adsorption process by means of an automatic gas adsorption measuring apparatus "AUTOSORB-1" available from Quanta Chrome Corp.

Test 10: Glass Transition Temperature (Tg)

With Rheovibron available from Orientech, a clear film of the subbing layer material with a width of 3 mm, a length of 50 mm and a thickness of about 50 μm was measured for loss elastic modulus E" of temperature dependency of dynamic viscoelasticity at 110 Hz. The peak temperature of E" was determined as Tg.

Test 11: pH Measurement Method pH: Measurement is effected at a temperature of 23° C. by means of a pH meter "pH18" available from Yokogawa Electric Works, Limited.

TABLE 2

| No. | Adhesion | Powder falling | Peelability A | B | C | D | E |
|---|---|---|---|---|---|---|---|
| 1 | 38 | O | O 40" | O 10" | — | O | O |
| 2 | 40 | O | O 40" | O 10" | — | O | O |
| 3 | 45 | O | O 40" | O 10" | — | O | O |
| 4 | 50 | O | O 40" | O 10" | — | O | O |
| 5 | 40 | O | X | X | O 2° | O | X |
| 6 | 0 | X | X | X | O 30' | O | X |
| 7 | 50 | O | X | O 3' | | O | O |
| 8 | 50 | O | X | X | O 1° | O | Δ |

TABLE 2-continued

| No. | Adhesion | Powder falling | Peelability A | B | C | D | E |
|-----|----------|----------------|---------------|------|------|------|------|
| 9   | 50       | ○              | ○ 40″         | ○ 10″ | —    | ○    | ○    |
| 10  | 52       | ○              | ○ 1′          | ○ 15″ | —    | ○    | ○    |
| 11  | 56       | ○              | ○ 1′          | ○ 15″ | —    | ○    | ○    |
| 12  | 48       | ○              | ○ 1′          | ○ 15″ | —    | ○    | ○    |
| 13  | 40       | ○              | X             | X    | X    | ○ 2° | ○    | X |
| 14  | 0        | X              | X             | X    | X    | ○ 30′ | ○   | X |

Adhesion: gf/8 mm width
Peelability:
A: 0.1 wt % aqueous solution of Na$_2$CO$_3$, 40° C.
B: 0.5 wt % aqueous solution of NaOH, 40° C.
C: 5 wt % aqueous solution of NaOH, 90° C.
D: water, 40° C.
E: Coloration and decrease in molecular weight of recovered PET support For example, 10″ indicates 10 seconds, 1′ indicates 1 minute, and 1° indicates 1 hour, hereinafter the same.

Table 2 shows that the specimens comprising the subbing layer of the present invention exhibit an improved adhesion between the magnetic layer and the nonmagnetic plastic support and an excellent running durability. It is further shown that when subjected to processing with an alkali, the specimens according to the present invention show easy peeling of the magnetic layer from the nonmagnetic plastic support.

On the other hand, it was also shown that the specimens comprising a subbing agent such as polyester, which was a conventional material for a subbing layer, do not show peeling with a weak alkali or low concentration alkaline aqueous solution (0.1 wt % aqueous solution of Na$_2$CO$_3$ or 0.5 wt % aqueous solution of NaOH) (Specimen Nos. 5 and 13). Specimen Nos. 6 and 14, which comprised no subbing layer, exhibited powder falling and a poor peelability with a weak alkali or low concentration alkaline aqueous solution. Further, Specimen No. 8, which contained a small amount of COOH group, showed no peeling. PET recovered from this specimen by peeling with a strong alkaline aqueous solution (5 wt % aqueous solution of NaOH) showed coloring and a drop in molecular weight.

EXAMPLE 2 AND COMPARATIVE EXAMPLE 2

The resins set forth in Table 3 were coated on PET in the form of solution in a 7/3 mixture (by weight) of MEK and cyclohexanone to form subbing layers. Specimens were prepared in the same manner as in Example 1 except that a vinyl chloride-vinyl acetate-maleic anhydride copolymer ("400X110A" available from Nippon Zeon K. K.; polymerization degree: 400) was used as binder for magnetic layer instead of The results are set forth in Table 4.

TABLE 3

| No. | Polyurethane Structure | COOH group content (eq/g) | Acid value | Weight-average molecular weight (× 10$^4$) | Tg (°C.) | Subbing layer material solubility |
|-----|------------------------|---------------------------|------------|--------------------------------------------|----------|-----------------------------------|
| 15  | HMDI/TDI/DMP/2EG = 30/20/30/20 | 21 × 10$^{-4}$ | 108 | 4.8 | 85 | ○ |
| 16  | HMDI/MDI/DMP/4EG = 10/40/30/20 | 18 × 10$^{-4}$ | 102 | 5.2 | 80 | ○ |
| 17  | HMDI/DMP/BD/AA = 40/40/10/10 | 28 × 10$^{-4}$ | 155 | 3.9 | 40 | ○ |
| 18  | MDI/DMB/PCL = 50/30/20 | 8 × 10$^{-4}$ | 45 | 8.0 | 50 | ○ |
| 19  | "STAFIX" (Fuji Photo Film) | — | — | — | 25 | ○ |
| 20  | TDI/DMP/4EG = 50/17.5/32.5 | 10 × 10$^{-4}$ | 56 | 3.6 | 40 | ○ |
| 21  | MDI/DMP/BD/AA = 40/20/20/20 | 7 × 10$^{-4}$ | 41 | 6.0 | 25 | ○ |
| 22  | TDI/DMP/4EG = 40/7.5/42.5 | 4 × 10$^{-4}$ | 22 | 4.3 | 40 | X |

HMDI: Hexamethylene diisocyanate
MDI: Diphenylmethane diisocyanate
TDI: Tolylenediisocyanate
DMP: Dimethylolpropionic acid
2EG: Diethylene glycol
4EG: Tetraethylene glycol
DMB: Dimethylolbutyric acid
BD: Butanediol
AA: Adipic acid
PCL: Polycaprolactone Synthesis Monomer Composition A was dissolved in 226 g of cyclohexanone in a 1 l three-necked round flask equipped with a condenser and an agitator which had been previously nitrogen-substituted. Monomer Composition B was then added to the system. 0.31 g (0.49 mmol) of di-n-butyltin dilaurate was added to the system as catalyst. The system was then heated at a temperature of 90° C. under reflux in a nitrogen stream to obtain a polyurethane solution.

| Formulation No. | Monomer Composition A | Monomer Composition B |
|-----------------|-----------------------|-----------------------|
| 15 | DMP = 0.24 mol<br>2EG = 0.16 mol | HMDI = 0.24 mol<br>TDI = 0.1 mol |
| 16 | DMP = 0.24 mol<br>4EG = 0.16 mol | HMDI = 0.04 mol<br>TDI = 0.36 mol |
| 17 | DMP = 0.4 mol<br>BD—AA(2000) = 0.01 mol | HMDI = 0.4 mol |
| 18 | DMB = 0.24 mol<br>PCL(1000) = 0.01 mol | MDI = 0.4 mol |
| 20 | DMP = 0.14 mol<br>4EG = 0.26 mol | TDI = 0.4 mol |
| 21 | DMP = 0.2 mol<br>BD—AA(800) = 0.2 mol | MDI = 0.4 mol |
| 22 | DMP = 0.06 mol<br>4EG = 0.34 mol | TDI = 0.4 mol |

BD—AA(2000): Polybutylene azipate; Molecular weight: about 2,000
BD—AA(800): Polybutylene azipate; Molecular weight: about 800

TABLE 4

| No. | Adhesion (gf/8mm) | Powder falling | Magnetic tape peelability | | | | |
|---|---|---|---|---|---|---|---|
| | | | A | B | C | D | E |
| 15 | 65 | ○ | ○ 30" | ○ 10" | — | ○ | ○ |
| 16 | 50 | ○ | ○ 30" | ○ 10" | — | ○ | ○ |
| 17 | 45 | ○ | ○ 30" | ○ 10" | — | ○ | ○ |
| 18 | 60 | ○ | ○ 30" | ○ 10" | — | ○ | ○ |
| 19 | 40 | ○ | X | X | ○ 2° | ○ | X |
| 20 | 48 | ○ | ○ 30" | ○ 10" | — | ○ | ○ |
| 21 | 70 | ○ | X | X | ○ 1° | ○ | Δ |
| 22 | 50 | ○ | X | X | ○ 2° | ○ | X |

Table 4 shows that the specimens comprising the subbing layer of the present invention exhibited an improved adhesion between the magnetic layer and the nonmagnetic plastic support and an excellent running durability. It is further shown that when subjected to processing with an alkali, the present specimens showed easy peeling of the magnetic layer off the nonmagnetic plastic support.

On the other hand, it is also shown that the specimens comprising a subbing agent such as polyester, which was a conventional material for a subbing layer, do not peeling with a weak alkali or low concentration alkaline aqueous solution (0.1 wt % aqueous solution of $Na_2CO_3$ or 0.5 wt % aqueous solution of NaOH) (Specimen No. 19). It is further shown that Specimen No. 21, which contains COOH group in an amount of $7 \times 10^{-4}$ eq/g and had an acid value of 41, showed a slightly insufficient and limited peelability with a weak alkali or low concentration alkaline aqueous solution. Further, Specimen No. 22, which contained a small amount of COOH group, showed no peeling. PET recovered from this specimen by peeling with a strong alkaline aqueous solution (5 wt % aqueous solution of NaOH) showed coloring and a drop in molecular weight.

EXAMPLE 3 AND COMPARATIVE EXAMPLE 3

The resins set forth in Table 5 were coated on PET in the form of solution in a 2/8 mixture (by weight) of MEK and cyclohexanone to form subbing layers. Specimens were prepared in the same manner as in Example 1 except that, as binder for magnetic layer, a vinyl chloride-vinyl acetate-maleic anhydride copolymer ("400X110A" available from Nippon Zeon K. K.; polymerization degree: 400) was used instead of MR110. The results are set forth in Table 6.

TABLE 5

| No. | | Polar group | | Weight-average molecular weight | Tg (°C.) | Subbing layer material Solubility |
|---|---|---|---|---|---|---|
| | | Type (eq/g) | Amount | | | |
| 23 | Polyethylene glycol polyurethane | —SO$_3$H | $4 \times 10^{-4}$ | 3.2 | 35 | ○ |
| 24 | Polycaprolactone polyurethane | —SO$_4$H | $8 \times 10^{-4}$ | 4.3 | 43 | ○ |
| 25 | Polycarbonate polyurethane | —PO$_3$H$_2$ | $4 \times 10^{-4}$ | 5.5 | 58 | ○ |
| 26 | Polypropylene glycol polyurethane | —PO$_3$H$_2$ | $10 \times 10^{-4}$ | 8.3 | 38 | ○ |
| 27 | "STAFIX" (Fuji Photo Film) | — | — | — | 25 | X |
| 28 | — | — | — | — | — | — |
| 29 | Polycaprolactone polyurethane | —SO$_4$H | $8 \times 10^{-5}$ | 5.0 | 30 | ○ |
| 30 | Polycaprolactone polyurethane | —SO$_4$H | $6 \times 10^{-5}$ | 4.0 | 30 | X |

TABLE 6

| No. | Adhesion | Powder falling | Magnetic tape peelability | | | | |
|---|---|---|---|---|---|---|---|
| | | | A | B | C | D | E |
| 23 | 92 | ○ | ○ 40" | ○ 10" | — | ○ | ○ |
| 24 | 113 | ○ | ○ 40" | ○ 10" | — | ○ | ○ |
| 25 | 105 | ○ | ○ 40" | ○ 10" | — | ○ | ○ |
| 26 | 121 | ○ | ○ 40" | ○ 10" | — | ○ | ○ |
| 27 | 40 | ○ | X | X | ○ 2° | ○ | X |
| 28 | 0 | X | X | X | ○ 30' | ○ | X |
| 29 | 53 | ○ | X | X | ○ 1° | ○ | Δ |
| 30 | 42 | ○ | X | X | ○ 2" | ○ | X |

Table 6 shows that the specimens comprising the subbing layer of the present invention exhibited an improved adhesion between the magnetic layer and the nonmagnetic plastic support and an excellent running durability. It was further shown that when subjected to processing with an alkali, the present specimens showed easy peeling of the magnetic layer from the nonmagnetic plastic support.

On the other hand, it was also shown that the specimens comprising a subbing agent such as polyester, which was a conventional material for a subbing layer, do not show peeling with a weak alkali or low concentration alkaline aqueous solution (0.1 wt % aqueous solution of $Na_2CO_3$ or 0.5 wt % aqueous solution of NaOH)(Specimen No. 27). Specimen No. 28, which comprised no subbing layer, exhibited powder falling and a poor peelability with a weak alkali or low concentration alkaline aqueous solution. It is further shown that Specimen No. 29, which contained a polar group in an amount of $8 \times 10^{-5}$ eq/g, showed a slightly insufficient and limited peelability with a weak alkali or low concentration alkaline aqueous solution. Further, Specimen No. 30, which contained a small amount of a polar group, showed no peeling. PET recovered from this specimen by peeling with a strong alkaline aqueous solution (5 wt % aqueous solution of NaOH) showed coloring and a drop in molecular weight.

EXAMPLE 4 AND COMPARATIVE EXAMPLE 4

The composition as set forth below was kneaded in admixture by a ball mill for 48 hours, and then filtered through a filter with an average pore diameter of 1 μm to prepare a magnetic coating. The resin set forth in Table 7 was coated on the surface of a 10-μm thick polyethylene terephthalate nonmagnetic plastic support in the form of solution in a 7/3 mixture (by weight) of acetone and cyclohexanone to a dried thickness of 0.1 μm, and then dried to obtain a subbing layer. The magnetic coating previously prepared was then coated on the layer thus obtained by a reverse roll to a dried thickness of 4 μm.

TABLE 7

| No. | Polyurethane structure | COOH group content (eq/g) | Acid value | Weight-average molecular weight | Tg (°C.) | Subbing layer material solubility |
|---|---|---|---|---|---|---|
| 31 | PA/AA/DMP/EG = 20/30/30/20 | $24 \times 10^{-4}$ | 133 | 3.5 | 85 | ○ |
| 32 | AA/DMP/NPG/BD = 50/20/20/10 | $16 \times 10^{-4}$ | 89 | 4.2 | 80 | ○ |
| 33 | AA/DMP/CHDM/PEG = 50/15/25/1 | $9 \times 10^{-4}$ | 50 | 5.1 | 40 | ○ |
| 34 | PA/AA/DMP/EG = 20/30/30/20 "STAFIX" (Fuji Photo Film) | $19 \times 10^{-4}$ 80 20 | 105 | — | 50 | ○ |
| 35 | "STAFIX" (Fuji Photo Film) | — | — | — | 25 | ○ |
| 36 | — | — | — | — | — | — |
| 37 | PA/DMB/DEG | $7 \times 10^{-4}$ | 39 | 2.5 | 25 | Δ |
| 38 | PA/DMB/DEG | $4 \times 10^{-4}$ | 22 | 3.0 | 30 | X |

DMP: Dimethylolpropionic acid
EG: Ethylene glycol
DEG: Diethylene glycol
DMB: Dimethylolbutyric acid
BD: Butanediol
AA: Adipic acid
PA: Isophthalic acid
CHDM: Cyclohexanedimethanol
PEG: Polyethylene glycol

| Composition of magnetic coating | (parts by weight) |
|---|---|
| Ferromagnetic alloy powder (formulation: Fe 94%; Zn 4%; Ni 2%; Hc: 1,500 Oe; BET specific surface area: 54 m²/g) | 100 |
| Polyester polyurethane (weight-average molecular weight: 40,000; number-average molecular weight: 25,000; two SO₃Na groups on the average per molecule) | 5 |
| Vinyl chloride-vinyl acetate-maleic anhydride copolymer ("400X110A" available from Nippon Zeon K.K.; polymerization degree: 400) | 12 |
| Abrasive (α-alumina, average particle diameter: 0.3 μm) | 5 |
| Stearic acid | 1 |
| Oleic acid | 1 |
| Butyl stearate | 2 |
| Carbon black (average grain diameter: 40 nm) | 2 |
| Methyl ethyl ketone | 200 |
| Cyclohexanone | 100 |

The nonmagnetic plastic support having a magnetic layer coated thereon was subjected to magnetic orientation by a magnet with 3,000 gauss while the magnetic layer was wet. After dried, the material was subjected to supercalender treatment. The material was then slit into 8-mm wide strips to prepare a video tape.

The tape specimen thus obtained was then subjected to the same tests as in Example 1. The results are set forth in Table 8.

TABLE 8

| No. | Adhesion (gf/8 mm width) | Power falling | Magnetic tape peelability | | | | |
|---|---|---|---|---|---|---|---|
| | | | A | B | C | D | E |
| 31 | 50 | ○ | ○ 40″ | ○ 10″ | — | ○ | ○ |
| 32 | 45 | ○ | ○ 40″ | ○ 10″ | — | ○ | ○ |
| 33 | 60 | ○ | ○ 40″ | ○ 10″ | — | ○ | ○ |
| 34 | 45 | ○ | ○ 40″ | ○ 10″ | — | ○ | ○ |
| 35 | 40 | ○ | X | X | ○ 2° | ○ | X |
| 36 | 0 | X | X | X | ○ 30′ | ○ | X |
| 37 | 55 | ○ | X | X | ○ 1° | ○ | Δ |
| 38 | 40 | ○ | X | X | ○ 2° | ○ | X |

Table 8 shows that the specimens comprising the subbing layer of the present invention exhibited an improved adhesion between the magnetic layer and the nonmagnetic plastic support and an excellent running durability. It is further shown that when subjected to processing with an alkali, the present specimens showed easy peeling of the magnetic layer off the nonmagnetic plastic support.

On the other hand, it is also shown that the specimens comprising a subbing agent such as polyester, which was conventional material for a subbing layer, do not show peeling with a weak alkali or low concentration alkaline aqueous solution (0.1 wt % aqueous solution of Na₂CO₃ or 0.5 wt % aqueous solution of NaOH) (Specimen No. 35). Specimen No. 36, which comprised no subbing layer, exhibited powder falling and a poor peelability with a weak alkali or low concentration alkaline aqueous solution. Further, Specimen No. 38, which contained a small amount of COOH group, showed no peeling. PET recovered from this specimen by peeling with a strong alkaline aqueous solution (5 wt % aqueous solution of NaOH) showed coloring and a drop in molecular weight.

EXAMPLE 5 AND COMPARATIVE EXAMPLE 5

The resins set forth in Table 9 were each coated on a 13-μm thick polyethylene terephthalate nonmagnetic plastic support in the form of solution in a 7/3 mixture (by weight) of MEK and cyclohexanone to a dried thickness of 0.1 μm, and then dried. On the subbing layer was then formed a 150-nm thick cobalt-nickel magnetic film by tilted vacuum deposition to prepare raw magnetic tape. As an evaporation source there was used an electron beam evaporator charged with a cobalt-nickel alloy (Co: 80 wt %; Ni: 20 wt %). The tilted deposition was effected with an incidence angle of 50 degree. On the thin metal film on the raw magnetic tapes thus obtained were coated "KRITOX157SL" (available from Du Pont) as lubricant in the form of solution in "FOMBLIN ZS100" (available from MONTEFLUOS) in an amount of 5.5 mg/m² as calculated in terms of solid content. After dried, the materials were slit into 8-mm wide strips to obtain 8-mm video tapes. The magnetic layer thus formed had a void of 30% by volume. These specimens were then subjected to the same tests as in Example 1. The results are set forth in Table 9.

TABLE 9

| No. | Subbing material | Magnetic tape peelability | | | | |
|---|---|---|---|---|---|---|
| | | A | B | C | D | E |
| 39 | 1 | ○ 40" | ○ 10" | — | ○ | ○ |
| 40 | 15 | ○ 40" | ○ 10" | — | ○ | ○ |
| 41 | 23 | ○ 40" | ○ 10" | — | ○ | ○ |

Table 9 shows that the effects of the subbing material of the present invention are the same in thin metal film.

EXAMPLE 6

The resins as used in Specimen Nos. 1, 9, 15, 20, 23 and 31 were each coated on a 75-μm polyethylene terephthalate nonmagnetic plastic support in the form of solution in a 8/2 mixture (by weight) of acetone and cyclohexanone to a dried thickness of 0.1 μm, and then dried to form subbing layers. On these subbing layers were coated the following magnetic coatings compositions. First, the following compositions were kneaded in admixture by a kneader for about 1 hour.

| Magnetic coating composition | (parts by weight) |
|---|---|
| Ferromagnetic alloy powder | 100 |
| (formulation: Fe 99%; Ni 1%; | |
| Hc: 1,580 Oe; specific surface | |
| area: 50 m²/g; saturated | |
| magnetizability: 130 emu/g) | |
| Vinyl chloride copolymer | 13.5 |
| (MR110 available from Nippon Zeon K.K.; | |
| polymerization degree: 320; | |
| containing SO₃K group, epoxy group, | |
| OH group) | |
| Abrasive (Cr₂O₃, average grain | 10 |
| diameter: 0.5 μm) | |
| Carbon black (Ketchen Black EC | 10 |
| available from Lion Akuso; average | |
| grain diameter: 30 nm) | |
| Carbon black (Thermax MT available | 3 |
| from Kankarubu; average grain | |
| diameter: 280 nm) | |
| Toluene | 36 |
| Cyclohexanone | 36 |

To the uniform compositions thus obtained were added the following compositions. These compositions were subjected to dispersion by a sand grinder at 2,000 rpm for 2 hours to obtain uniform dispersions.

| | (parts by weight) |
|---|---|
| Polyurethane resin (alcohol content: cyclohexane-1-4-dimethanol 70 mol %; butanediol 30 mol %; acid content: adipic acid, polyisocyanate: 15 mol % of alcohol content; containing 1.0 wt % of —COOH) | 5.1 |
| Methyl ethyl ketone | 250 |
| Toluene | 250 |

To these dispersions were then added the following compositions. These components were uniformly mixed to prepare magnetic coating compositions.

| | (parts by weight) |
|---|---|
| Tridecyl stearate (corresponding to 38 wt. % of the total weight of binder) | 11 |
| Polyisocyanate (Colonate L available from Nippon Polyurethane) | 11.4 |

These magnetic coating composition were each coated on both surfaces of the above polyethylene terepthalate film by a gravure roll to a dried thickness of 3.0 μm, dried at a temperature of about 100° C., and then supercalendered at a temperature of about 40° C. to obtain ferromagnetic metal powder system magnetic recording media. The resulting magnetic layer exhibited a void of 4% by volume.

The magnetic recording medium sheets thus obtained were punched into 3.5-inch diameter floppy disks.

These specimens were then mounted in a cartridge comprising a nonwoven cloth No. 9246 (available from Kendal) as liner.

These specimens were subjected to the following tests. The results are set forth in Table 10.

TABLE 10

| Specimen No. | Polymer No. | Powder falling | Floppy disk peelability | | | | |
|---|---|---|---|---|---|---|---|
| | | | A | B | C | D | E |
| 42 | 1 | ○ | ○ 40" | ○ 10" | — | ○ | ○ |
| 43 | 9 | ○ | ○ 40" | ○ 10" | — | ○ | ○ |
| 44 | 15 | ○ | ○ 40" | ○ 10" | — | ○ | ○ |
| 45 | 20 | ○ | ○ 40" | ○ 10" | — | ○ | ○ |
| 46 | 23 | ○ | ○ 40" | ○ 10" | — | ○ | ○ |
| 47 | 31 | ○ | ○ 40" | ○ 10" | — | ○ | ○ |
| Commercial (1) | — | ○ | X | X | ○ 2° | ○ | X |
| Commercial (2) | — | ○ | X | X | ○ 2° | ○ | X |
| Commercial (3) | — | ○ | X | X | ○ 30" | ○ | X |
| Commercial (4) | — | ○ | X | X | ○ 2° | ○ | X |
| Commercial (5) | — | ○ | X | X | ○ 30" | ○ | X |
| Commercial (6) | — | ○ | X | X | ○ 30" | ○ | X |
| Commercial (7) | — | ○ | X | X | ○ 1" | ○ | X |
| Commercial (8) | — | ○ | X | X | ○ 30" | ○ | X |

Commercial (1): MF2HD available from Fuji Photo Film Co., Ltd.
Commercial (2): MF2DD available from Fuji Photo Film Co., Ltd.
Commercial (3): M2HD256 (Lot. K928K362); 5 inch available from TDK
Commercial (4): M2DD (5 inch) available from MAXELL
Commercial (5): M2DD (Lot. OMO2T124D); 5 inch available from SONY
Commercial (6): MF-2DD (3.5 inch) available from TDK
Commercial (7): SUPER RD MF2DD (Lot. L040J15); 3.5 inch available from MAXELL
Commercial (8): MF-2DD (Lot. W351089); 3.5 inch available from SONY It is understood from the results in Table 10 that the floppy disks having the subbing layer according to the present invention exhibited good peelability in a weak alkaline aqueous solution or a low concentration alkaline aqueous solution. The commercial floppy disks exhibited extremely deteriorated peelability.

EXAMPLE 7 (Multi-Layer Video Tape)

The resins as used in Specimen Nos. 1, 9, 15, 20, 23 and 31 were each coated on a 15-μm polyethylene terepthalate nonmagnetic plastic support in the form of solution in a 8:2 mixture (by weight) of acetone and cyclohexanone to a dried thickness of 0.1 μm, and then dried to form subbing layers. On these subbing layers were coated magnetic coating compositions which had been prepared as follows:

| (1) Lower magnetic layer coating solution | (parts by weight) |
|---|---|
| Co-r-$Fe_2O_3$ (Hc: 650 Oe; specific surface area: 40 $m^2$/g) | 100 |
| Vinyl chloride copolymer (polymerization degree: 260; $SO_3Na$ group content: $6 \times 10^{-5}$ eq/g, epoxy group content: $20 \times 10^{-5}$ eq/g; OH group content: $40 \times 10^{-5}$ eq/g; vinyl chloride content: 86 wt %) | 12 |
| Polyester polyurethane ($SO_3Na$ group content: $8 \times 10^{-5}$ eq/g; OH group content: $10 \times 10^{-5}$ eq/g; weight-average molecular weight: 30,000) | 5 |
| Methyl ethyl ketone | 20 |
| Toluene | 20 |
| Cyclohexanone | 20 |

These components were then kneaded in admixture by an open kneader. To the material were then added the following compositions:

| | (parts by weight) |
|---|---|
| Stearic acid | 2 |
| Tridecyl stearate | 2 |
| Carbon black (average grain diameter: 80 nm) | 2 |
| Methyl ethyl ketone | 100 |
| Cylcohexanone | 50 |
| Toluene | 150 |

The material was then subjected to dispersion by a sand grinder.

To the dispersion were added 5 parts by weight of a polyisocyanate compound ("Colonate L" available from Nippon Polyurethane Co., Ltd.) and 20 parts by weight of methyl ethyl ketone in admixture to prepare coating compositions for lower magnetic layer.

| (2) Upper magnetic layer coating solution | (parts by weight) |
|---|---|
| Co-r-$Fe_2O_3$ (Hc: 700 Oe; specific surface area: 45 $m^2$/g) | 100 |
| Vinyl chloride copolymer (polymerization degree: 260; $SO_3Na$ group content: $6 \times 10^{-5}$ eq/g; epoxy group content: $20 \times 10^{-5}$ eq/g; OH group content: $40 \times 10^{-5}$ eq/g; vinyl chloride content: 86 wt %) | 12 |
| Polyester polyurethane ($SO_3Na$ group content: $8 \times 10^{-5}$ eq/g; OH group content: $10 \times 10^{-5}$ eq/g; weight-average molecular weight: 30,000) | 5 |
| α-$Al_2O_3$ (average grain diameter: 0.08 μm) | 5 |
| Methyl ethyl ketone | 10 |
| Toluene | 10 |
| Cyclohexanone | 10 |

These components were then kneaded in admixture by a press kneader. To the material were then added the following compositions:

| | (parts by weight) |
|---|---|
| Stearic acid | 2 |
| Tridecyl stearate | 2 |
| Carbon black (average grain diameter: 40 nm) | 2 |
| Methyl ethyl ketone | 100 |
| Cylcohexanone | 50 |
| Toluene | 150 |

The material was then subjected to dispersion by a sand grinder to prepare upper magnetic layer coating compositions.

The lower magnetic layer coating compositions thus obtained were each coated on the above polyethylene terephthalate nonmagnetic plastic support having a subbing layer by a reverse roll to a dried thickness of 3.0 μm. On the lower magnetic layer were then each coated the upper magnetic layer coating compositions by a reverse roll to a dried thickness of 0.5 μm while the lower magnetic layer was in wet state. The material was subjected to orientation, dried, supercalendered, and then slit into ½ inch wide strips. The resulting magnetic layer exhibited a void of 26%.

These specimens were then subjected to the same test as in Example 1. The results are set forth in Table 11.

TABLE 11

| Specimen No. | Polymer No. | Powder falling | Floppy disk peelability | | | | |
|---|---|---|---|---|---|---|---|
| | | | A | B | C | D | E |
| 48 | 1 | ○ | ○ 40″ | ○ 10″ | — | ○ | ○ |
| 49 | 9 | ○ | ○ 40″ | ○ 10″ | — | ○ | ○ |
| 50 | 15 | ○ | ○ 40″ | ○ 10″ | — | ○ | ○ |
| 51 | 20 | ○ | ○ 40″ | ○ 10″ | — | ○ | ○ |
| 52 | 23 | ○ | ○ 40″ | ○ 10″ | — | ○ | ○ |
| 53 | 31 | ○ | ○ 40″ | ○ 10″ | — | ○ | ○ |
| Commercial (9) | — | ○ | X | X | ○ 2° | ○ | X |
| Commercial (10) | — | ○ | X | X | ○ 2° | ○ | X |
| Commercial (11) | — | ○ | X | X | ○ 2° | ○ | X |
| Commercial (12) | — | ○ | X | X | X | ○ | X |

Commercial (9): VHS SUPER AG DC available from Fuji Photo Film Co., Ltd.
Commercial (10): AXIA AV tape DC available from Fuji Photo Film Co., Ltd.
Commercial (11): HART GALLERY HG (Lot. J139CD1) available from Konica
Commercial (12): SS-XPHiFi (Lot. ADCF001) available from TDK It is understood from the results in Table 11 that the multi-layer video tapes having the subbing layer according to the present invention exhibited good peelability in a weak alkaline aqueous solution or a low concentration alkaline aqueous solution. The commercial floppy disks exhibited extremely deteriorated peelability.

EXAMPLE 8 (8 MM Video Tape With Backing Layer)

The resins as used in Specimen Nos. 1, 9, 15, 20, 23 and 31 were each coated on a 10-μm polyethylene terepthalate nonmagnetic plastic support in the form of solution in a 8/2 mixture (by weight) of acetone and cyclohexanone to a dried thickness of 0.1 μm, and then dried to form subbing layers. On these subbing layers were each coated magnetic coating compositions and back coat coating compositions which had been prepared as follows:

| Magnetic coating composition | (parts by weight) |
|---|---|
| Ferromagnetic alloy powder (formulation: Fe 98%; Ni 2%; Hc: 1,500 Oe; BET specific surface area: 50 m$^2$/g) | 100 |
| Polyurethane (N-2301 available from Nippon Polyurethane) | 5 |
| Vinyl chloride-vinyl acetate-maleic anhydride copolymer (400X110A available from Nippon Zeon K.K.; polymerization degree: 400) | 12 |
| Abrasive (α-alumina, average grain diameter: 0.5 μm) | 5 |
| Stearic acid | 2 |
| Oleic acid | 1 |
| Butyl stearate | 2 |
| Carbon black (average grain diameter: 40 nm) | 2 |
| Methyl ethyl ketone | 317 |
| Polyisocyanate compound (Colonate L available from Nihon Polyurethane) | 5 |

| Back coat composition | (parts by weight) |
|---|---|
| Carbon black (average grain diameter: 20 nm) | 100 |
| Nitrocelluse | 50 |
| Polyurethane (N-2301 available from Nippon Polyurethane) | 5 |
| Polyisocyanate compound (Colonate L available from Nippon Polyurethane) | 5 |
| Methyl ethyl ketone | 500 |
| Toluene | 10 |

The magnetic layer coating composition was coated on the above polyethylene terephthalate nonmagnetic support having a subbing layer by a reverse roll to a dried thickness of 3.0 μm. The back coat composition was then coated on the other surface of the support, and then dried to prepare specimens. The backing layer thus formed had a void of 20% by volume.

These specimens were then subjected to the following tests. The results are set forth in Table 12.

TABLE 12

| Specimen No. | Polymer No. | Powder falling | Floppy disk peelability A | B | C | D | E |
|---|---|---|---|---|---|---|---|
| 54 | 1 | ○ | ○ 40" | ○ 10" | — | ○ | ○ |
| 55 | 9 | ○ | ○ 40" | ○ 10" | — | ○ | ○ |
| 56 | 15 | ○ | ○ 40" | ○ 10" | — | ○ | ○ |
| 57 | 20 | ○ | ○ 40" | ○ 10" | — | ○ | ○ |
| 58 | 23 | ○ | ○ 40" | ○ 10" | — | ○ | ○ |
| 59 | 31 | ○ | ○ 40" | ○ 10" | — | ○ | ○ |
| Commercial (13) | — | 0 | X | X | ○ 2" | ○ | X |
| Commercial (14) | — | ○ | X | X | ○ 2" | ○ | X |
| Commercial (15) | — | ○ | X | X | ○ 30' | ○ | X |
| Commercial (16) | — | ○ | X | X | X | ○ | X |
| Commercial (17) | — | ○ | X | X | ○ 30' | ○ | X |

TABLE 12-continued

| Specimen No. | Polymer No. | Powder falling | Floppy disk peelability A | B | C | D | E |
|---|---|---|---|---|---|---|---|

Commercial (13): 8 mm video tape SUPER AG Slim available from Fuji Photo Film Co., Ltd.
Commercial (14): 8 mm video tape SUPER HG Slim available from Fuji Photo Film Co., Ltd.
Commercial (15): 8 mm video tape HG120 (Lot. 4020 154) available from SONY
Commercial (16): 8 mm video tape HG120 (Lot. ALA10 1014) available from TDK
Commercial (17): 8 mm video tape HG120 (Lot. GO596) available from MAXELL It is understood from the results in Table 12 that the 8 mm video tapes having the subbing layer according to the present invention exhibited good peelability in a weka alkaline aqueous solution or a low concentration alkaline aqueous solution. The commercial floppy disks exhibited extremely deteriorated peelability.

EXAMPLE 9 (Single-Layer Video Tape)

The resins as used in Specimen Nos. 1, 9, 15, 20, 23 and 31 were each coated on a 15-μm polyethylene terephthalate nonmagnetic plastic support in the form of solution in a 8/2 mixture (by weight) of acetone and cyclohexanone to a dried thickness of 0.1 μm, and then dried to form subbing layers. On these subbing layers was a coated magnetic coating composition which had been prepared as follows:

| Magnetic layer coating composition | (parts by weight) |
|---|---|
| C-r-Fe$_2$O$_3$ (Hc: 700 Oe; specific surface area: 45 m$^2$/g) | 100 |
| Vinyl chloride copolymer (polymerization degree: 260; SO$_3$Na group content: 6 × 10$^{-5}$ eq/g; epoxy group content: 20 × 10$^{-5}$ eq/g; OH group content: 40 × 10$^{-5}$ eq/g; vinyl chloride content: 86 wt %) | 12 |
| Polyester polyurethane (SO$_3$Na group content: 8 × 10$^{-5}$ eq/g; OH group content: 10 × 10$^{-5}$ eq/g; weight-average molecular weight: 30,000) | 5 |
| α-Al$_2$O$_3$ (average grain diameter: 0.08 μm) | 5 |
| Methyl ethyl ketone | 10 |
| Toluene | 10 |
| Cyclohexanone | 10 |

These components were then kneaded in admixture by a press kneader. To the material were then added the following compositions:

| | (parts by weight) |
|---|---|
| Stearic acid | 2 |
| Tridecyl stearate | 2 |
| Carbon black (average grain diameter: 40 nm) | 2 |
| Methyl ethyl ketone | 100 |
| Cylcohexanone | 50 |
| Toluene | 100 |

The material was then subjected to dispersion by a sand grinder to prepare upper magnetic layer coating compositions.

The magnetic layer coating composition thus obtained were each coated on the above polyethylene terephthalate nonmagnetic plastic support having a subbing layer by a reverse roll to a dried thickness of 3.5 μm. The material was subjected to orientation by a magnet, dried, supercalendered, and then slit into ½ inch wide strips to obtain video tapes. The resulting magnetic layer exhibited a void of 25% by volume.

These specimens were then subjected to the following tests. The results are set forth in Table 13.

TABLE 13

| Specimen No. | Polymer No. | Powder falling | Floppy disk peelability | | | | |
|---|---|---|---|---|---|---|---|
| | | | A | B | C | D | E |
| 60 | 1 | ○ | ○ 40″ | ○ 10″ | — | ○ | ○ |
| 61 | 9 | ○ | ○ 40″ | ○ 10″ | — | ○ | ○ |
| 62 | 15 | ○ | ○ 40″ | ○ 10″ | — | ○ | ○ |
| 63 | 20 | ○ | ○ 40″ | ○ 10″ | — | ○ | ○ |
| 64 | 23 | ○ | ○ 40″ | ○ 10″ | — | ○ | ○ |
| 65 | 31 | ○ | ○ 40″ | ○ 10″ | — | ○ | ○ |
| Commercial (18) | — | ○ | X | X | ○ 30′ | ○ | X |
| Commercial (19) | — | ○ | X | X | ○ 2° | ○ | X |
| Commercial (20) | — | ○ | X | X | ○ 30′ | ○ | X |
| Commercial (21) | — | ○ | X | X | ○ 1° | ○ | X |

Commercial (18): SSHS (Lot. AFAA007) available from TDK
Commercial (19): VX (Lot. 1260BB712) available from MAXELL
Commercial (20): VB (Lot. 4E72038) available from SONY
Commercial (21): EG-TV (Lot. OJ203) available from 3M It is understood from the results in Table 13 that the single-layer video tapes having the subbing layer according to the present invention exhibited good peelability in a weka alkaline aqueous, solution or a low concentration alkaline aqueous solution. The commercial floppy disks exhibited extremely deteriorated peelability.

EXAMPLE 10

Magnetic tape specimen Nos. 48 to 53 were cut into small pieces by a rotary cutter. 200 g of each of these pieces was charged into a tank filled with 4 l of a 0.5% (0.125N) aqueous solution of NaOH. The tank was equipped with an agitator having turbine blades. The tank was partitioned at its bottom by a plate having pores with a diameter of 3 mm. The temperature of the NaOH aqueous solution was adjusted to 40° C. The material was vigorously stirred at 800 rpm.

These specimens were sampled 10 minutes after being charged into the tank. It was confirmed that the film and the ferromagnetic powder had been completely peeled off each other. The agitation continued for 10 minutes so that the ferromagnetic powder thus peeled was finely divided. When the agitation was suspended, most of the ferromagnetic powder settled down through the porous plate so that it was separated from the film. The solution was removed from the tank through its bottom to withdraw the ferromagnetic powder. Water was then put into the tank. The content of the tank was stirred. The content was then neutralized with HCl to pH 6.0 to 7.0. The agitation continued and was then suspended. The solution was removed from the tank. This procedure was repeated. Thus, the ferromagnetic powder was completely separated from the film. These procedures were repeated four times. As a result, 130 g of PET film was recovered without any quality deterioration.

EXAMPLE 11

Magnetic tape specimen Nos. 48 to 53, which comprised subbing layers of the present invention coated therein, were previously cut into 2 to 30 mm pieces by a commercial rotary cutter for peeling test. The apparatus used for peeling test was an agitating tank having an inner diameter of 800 mm and a depth of 1,000 mm equipped with a heating jacket. The agitating tank was partitioned at its bottom by a porous plate with pores having a diameter of 2 mm. Two agitating blades having a diameter of 750 mm and a width of 120 mm were positioned over the porous plate. The agitating tank was filled with 350 ml of hot water at a temperature of 40° C. 1.75 Kg of solid NaOH was then dissolved in the hot water. 35 Kg of the magnetic tape pieces was charged into the tank. The material was then vigorously stirred at 110 rpm. The material was sampled in a 100-cc beaker 30 minutes after the agitation to see how much the ferromagnetic powder was peeled off the film. It was confirmed that the ferromagnetic powder had been completely peeled off the pieces.

The agitation continued for 30 minutes so that the ferromagnetic powder thus separated was finely divided. The agitation was then suspended. The bottom valve was opened and the solution was then removed so that most of the ferromagnetic powder thus peeled was separated through the porous plate. The bottom valve was then closed. 350 l of water was put into the tank. The content of the tank was stirred. NaOH was neutralized with 300 ml of 35% HCl to pH 6.6. The agitation continued for 15 minutes and was then suspended. The solution was removed from the tank so that the remaining ferromagnetic powder was separated. This procedure of water supply, agitation and removal was repeated four times to further separate the ferromagnetic powder. 5 g of the film thus processed was sampled and then measured for the remaining amount of ferromagnetic powder. The result was 5 ppm or less. The film thus processed was then dissolved for the measurement of I.V. The result was 0.64, which is almost the same as the initial value. The film thus processed was dehydrated and dried to obtain 22 Kg of film pieces.

EXAMPLE 12

Magnetic tape specimen Nos. 48 to 53 wound in the form of pancake, which comprised subbing layers of the present invention coated therein, were used for the following experiment. Magnetic tape specimens were fed from a roll feed and then dipped in a tank filled with a 0.5 wt % aqueous solution of NaOH at a temperature of 70° C. The specimens were then fed to the subsequent peeling tank so that the ferromagnetic powder was scraped by a blade from the base while being sprayed with a shower of washing water. Thus, slight amounts of ferromagnetic powder and NaOH were washed away from the base. The specimens were then sprayed with hot air so that the base was dried. The specimens were then wound in a roll. The conveying speed of the base was 30 m/min. The dipping length of the base in the NaOH solution was 1.4 m (dipping time: 3 seconds). The base thus processed showed no ferromagnetic powder attached thereto (residual Fe: 1 ppm or less) and I.V. of 0.64, which was almost the same as the initial value.

As has been described, the magnetic recording medium of the present invention comprises a novel subbing layer, which is easily soluble in a weak alkali or low concentration alkaline aqueous solution, particularly weak alkali or low concentration alkaline aqueous solution with an initial pH of less than 13, between a nonmagnetic plastic support and a magnetic layer, so that the nonmagnetic plastic support can be easily peeled off from a magnetic recording medium. In other words, the weak alkali or low concentration alkaline aqueous solution penetrates the magnetic layer through voids therein to dissolve the novel subbing layer so that the magnetic layer can be extremely easily peeled off from the base. Thus, magnetic recording media suited to environmental protection can be provided.

The magnetic recording medium of the present invention may comprise a polymer containing carboxyl group in an amount of $2 \times 10^{-4}$ eq/g or more, polymer having an acid value of 13 or more, a copolymer containing as component a monomer comprising dicarboxylic acid or its anhydride, a polyurethane containing carboxylic acid or its salt in an amount of $8 \times 10^{-4}$ eq/g or more, a polyurethane having an acid value of 45 or more, a polyurethane containing at least one polar group consisting of $-SO_3M$, $-SO_4M$, $-OPO(OM)_2$ and $-PO(OM)_2$, in which M represents a hydrogen atom, and a part of M may be alkaline metal or ammonium, in an amount of $2 \times 10^{-4}$ eq/g or more, a polyester containing carboxyl group in an amount of $8 \times 10^{-4}$ eq/g or more, etc., so that an excellent adhesion between the nonmagnetic plastic support and the magnetic layer and/or backing layer can be provided and, when it is dipped in a weak alkali or low concentration alkaline aqueous solution upon disposal, the nonmagnetic plastic support can be easily recovered in almost complete form from the magnetic recording medium. The base material such as PET is not dissolved or hydrolyzed or otherwise degraded when the magnetic recording medium is dipped in the processing solution. Thus, the base material thus recovered can be recycled in almost complete form.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic plastic support having thereon a magnetic layer comprising magnetic particles in a binder and an optional backing layer on an opposite side of the nonmagnetic support as the magnetic layer, said magnetic recording medium further comprising a first subbing layer positioned between said nonmagnetic support and said magnetic layer, and a second subbing layer positioned between said nonmagnetic support and said backing layer, when said backing layer is present, said magnetic layer and said backing layer each having a void volume of 40% or less, and said first and second subbing layers having a higher solubility in a 0.5 wt % NaOH aqueous solution at 40° C. than that in water at 40° C. and being soluble in an alkaline aqueous solution having an initial pH of less than 13 or an alkaline aqueous solution having a concentration of 0.25N or less.

2. A magnetic recording medium as claimed in claim 1, wherein said subbing layers have higher solubility in an organic solvent and in said alkaline aqueous solution than that in water.

3. A magnetic recording medium as claimed in claim 1, wherein said subbing layers comprise a polymer which is dissolved in 50 g of a 0.5 wt % aqueous solution of NaOH at a temperature of 40° C. in an amount of at least 1 g.

4. A magnetic recording medium as claimed in claim 1, wherein said polymer in said subbing layers contains acidic polar groups selected from the group consisting of $-COOM$, $-SO_3M$, $-SO_4M$, $-PO_3M_2$, $-O-PO_3M_2$ and salts of those groups, wherein M represents hydrogen and/or an alkaline metal salt, provided that when said polymer contains said salt, said polymer exhibits acidity or has higher solubility in a 0.5 wt % alkaline aqueous solution at 40° C. than that in water at 40° C.

5. A magnetic recording medium as claimed in claim 4, wherein said subbing layers comprise polyurethane or polyester each containing said acidic polar groups in an amount of $2 \times 10^{-4}$ eq/g or more.

6. A magnetic recording medium as claimed in claim 1, wherein said subbing layers comprise a polymer containing a carboxyl ground in an amount of $2 \times 10^{-4}$ eq/g or more.

7. A magnetic recording medium as claimed in claim 1, wherein said subbing layers comprise a polymer having an acid value of 13 or more.

8. A magnetic recording medium as claimed in claim 1, wherein said subbing layers comprise a copolymer containing a monomer containing a dicarboxylic acid or an anhydride thereof.

9. A magnetic recording medium as claimed in claim 8, wherein said copolymer contains maleic anhydride in an amount of 10% by weight or more.

10. A magnetic recording medium as claimed in claim 1, wherein said subbing layers comprise a polyurethane or polyester containing a carboxyl group in an amount of $8 \times 10^{-4}$ eq/g or more.

11. A magnetic recording medium as claimed in claim 1, wherein said subbing layers comprise a polyurethane having an acid value of 45 or more.

12. A magnetic recording medium as claimed in claim 1, wherein said subbing layers have an adhesion strength of 30 gf or more and such a peel rate that said subbing layers are dissolved in a 0.5 wt % aqueous solution of NaOH at a temperature of 40° C. in 3 minutes.

13. A magnetic recording medium as claimed in claim 1, wherein said magnetic layer has a void of from 1 to 40% by volume and said subbing layers have a glass transition temperature of from 30° to 100° C. and such a peel rate that said subbing layers are dissolved in a 0.5 wt % aqueous solution of NaOH at a temperature of 40° C. in 3 minutes.

14. A magnetic recording medium as claimed in claim 1, wherein said nonmagnetic plastic support comprises polyethylene terephthalate or polyethylene terenaphthalate.

15. A magnetic recording medium comprising a nonmagnetic plastic support having thereon a magnetic layer comprising magnetic particles in a binder and an optional backing layer on an opposite side of the nonmagnetic support as the magnetic layer, said magnetic recording medium further comprising a first subbing layer positioned between said nonmagnetic support and said magnetic layer, and a second subbing layer positioned between said nonmagnetic support and said backing layer, when said backing layer is present, said magnetic layer and said backing layer each having a void volume of 40% or less, said first and second subbing layers comprising a polymer containing acidic polar groups, and being soluble in an alkaline aqueous solution having an initial pH of less than 13 or an alkaline aqueous solution having a concentration of 0.25N or less.

16. A magnetic recording medium as claimed in claim 15, wherein said subbing layers have such a peel rate that said subbing layers are dissolved in a 0.5 wt % aqueous solution of NaOH at 40° C. in 3 minutes.

17. A magnetic recording medium as claimed in claim 15, wherein said subbing layers comprise a polymer which is dissolved in 50 g of a 0.5 wt % aqueous solution of NaOH at a temperature of 40° C. in an amount of at least 1 g.

18. A magnetic recording medium as claimed in claim 15, wherein said acidic polar groups in said polymer of said subbing layers are selected from the group consisting of —COOM, —$SO_3M$, —$SO_4M$, —$PO_3M_2$, —O-$PO_3M_2$ and salts of those groups, wherein M represents hydrogen and/or an alkaline metal salt, provided that when said polymer contains said salt, said polymer exhibits acidity or has higher solubility in a 0.5 wt % alkaline aqueous solution at 40° C. than that in water at 40° C.

19. A magnetic recording medium as claimed in claim 15, wherein said subbing layers comprise a polymer containing a carboxyl group in an amount of $2 \times 10^{-4}$ eq/g or more.

20. A magnetic recording medium as claimed in claim 15, wherein said subbing layers comprise a polymer having an acid value of 13 or more.

21. A magnetic recording medium as claimed in claim 15, wherein said subbing layers comprise a copolymer containing a monomer containing a dicarboxylic acid or an anhydride thereof.

22. A magnetic recording medium as claimed in claim 21, wherein said copolymer contains maleic anhydride in an amount of 10% by weight or more.

23. A magnetic recording medium as claimed in claim 15, wherein said subbing layers comprise a polyurethane or polyester containing a carboxyl group in an amount of $8 \times 10^{-4}$ eq/g or more.

* * * * *